(12) United States Patent
Cho et al.

(10) Patent No.: US 12,474,097 B2
(45) Date of Patent: Nov. 18, 2025

(54) MULTI-WAY COOLANT VALVE AND HEAT PUMP SYSTEM HAVING THE SAME

(71) Applicants: Hyundai Motor Company, Seoul (KR); Kia Corporation, Seoul (KR); Hanon Systems, Daejeon (KR)

(72) Inventors: Wan Je Cho, Hwaseong-si (KR); Namho Park, Suwon-si (KR); Seong-Bin Jeong, Hwaseong-si (KR); Yeonho Kim, Seoul (KR); Tae Hee Kim, Ansan-si (KR); Jae-Eun Jeong, Hwaseong-si (KR); Man Hee Park, Suwon-si (KR); Jae Yeon Kim, Hwaseong-si (KR); Hyunjae Lee, Yongin-si (KR); Seong Woo Jeong, Daejeon (KR); Jung Bum Choi, Daejeon (KR); Ho Sung Kang, Daejeon (KR); Jeong Wan Han, Daejeon (KR)

(73) Assignees: Hyundai Motor Company, Seoul (KR); Kia Corporation, Seoul (KR); Hanon Systems, Daejeon (KR)

( * ) Notice: Subject to any disclaimer, the term of this patent is extended or adjusted under 35 U.S.C. 154(b) by 188 days.

(21) Appl. No.: 18/314,990

(22) Filed: May 10, 2023

(65) Prior Publication Data
US 2024/0151440 A1    May 9, 2024

(30) Foreign Application Priority Data
Nov. 7, 2022    (KR) .................. 10-2022-0146730

(51) Int. Cl.
F25B 41/20    (2021.01)
F16K 11/085   (2006.01)
F25B 30/00    (2006.01)

(52) U.S. Cl.
CPC .......... *F25B 41/20* (2021.01); *F16K 11/0853* (2013.01); *F25B 30/00* (2013.01)

(58) Field of Classification Search
CPC . F16K 11/0853; F25B 41/20; B60H 1/00485; F01P 2007/146
See application file for complete search history.

(56) References Cited

U.S. PATENT DOCUMENTS

2006/0118066 A1* 6/2006 Martins ............... F16K 11/0856
                                                      123/41.08
2015/0217622 A1* 8/2015 Enomoto .............. F16K 11/076
                                                         62/244

(Continued)

FOREIGN PATENT DOCUMENTS

KR    20230032228 A    3/2023

*Primary Examiner* — Marc E Norman
(74) *Attorney, Agent, or Firm* — Slater Matsil, LLP

(57) ABSTRACT

An embodiment multi-way coolant valve includes an outer housing including first to third outer inlets, first to third outer outlets, and a pump mount portion coupled to one of the outer outlets, an inner housing rotatably provided within the outer housing and including penetration holes corresponding to the outer inlets and outlets, a coolant line defined by a selective connection of the penetration holes such that the outer inlets and outlets are selectively connected, pads interposed between an interior circumference of the outer housing and an exterior circumference of the inner housing at locations of the outer inlets and outlets, respectively, and a driving unit connected to a rotation center of the inner housing to selectively rotate the inner housing within the outer housing, wherein the inner housing is configured to rotate by a preset interval according to a selected vehicle mode.

21 Claims, 19 Drawing Sheets

(56) References Cited

U.S. PATENT DOCUMENTS

| | | | |
|---|---|---|---|
| 2017/0002857 A1* | 1/2017 | Guest, Jr. | F16C 33/108 |
| 2021/0218088 A1* | 7/2021 | Kim | H01M 10/613 |
| 2022/0074510 A1* | 3/2022 | Kim | F16K 11/074 |
| 2023/0065082 A1 | 3/2023 | Jeong et al. | |

* cited by examiner

MULTI-WAY COOLANT VALVE AND HEAT PUMP SYSTEM HAVING THE SAME

CROSS-REFERENCE TO RELATED APPLICATIONS

This application claims the benefit of Korean Patent Application No. 10-2022-0146730, filed on Nov. 7, 2022, which application is hereby incorporated herein by reference.

TECHNICAL FIELD

The present disclosure relates to a multi-way coolant valve and a heat pump system having the same.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environmentally friendly vehicle capable of substantially substituting for an internal combustion engine vehicle is required, and the environmentally friendly vehicle is classified into an electric vehicle driven using a fuel cell or electricity as a power source and a hybrid vehicle driven using an engine and a battery.

In the electric vehicle or the hybrid vehicle among these environmentally friendly vehicles, a separate heater is not used unlike an air conditioner of a general vehicle, and an air conditioner used in the environmentally friendly vehicle is generally called a heat pump system.

Meanwhile, the electric vehicle generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, a cooling system, a heat pump system, and a battery cooling system, respectively, should be configured as separate closed circuits so as to prevent heat generation of the motor, an electric component, and the battery including a fuel cell.

Therefore, a size and a weight of a cooling module disposed at the front of the vehicle are increased, and a layout of connection pipes supplying a refrigerant and a coolant to each of the heat pump system, the cooling system, and the battery cooling system in an engine compartment becomes complicated.

In addition, a battery cooling system that heats or cools the battery according to the vehicle condition so that the battery can perform optimally is separately equipped, and a large number of valves are applied to be connected with respective connection pipes, which increases an overall manufacturing cost of a vehicle.

The above information disclosed in this background section is only for enhancement of understanding of the background of embodiments of the disclosure, and therefore it may contain information that does not form the prior art that is already known to a person of ordinary skill in the art.

SUMMARY

The present disclosure relates to a multi-way coolant valve and a heat pump system having the same. Particular embodiments relate to a multi-way coolant valve forming a plurality of coolant lines to simplify an overall configuration and a heat pump system having the same.

Embodiments of the present disclosure provide a multi-way coolant valve and a heat pump system having the same capable of forming a plurality of coolant lines through a single coolant valve, thereby being capable of simplifying the system layout and manufacturing cost.

Embodiments of the present disclosure provide a multi-way coolant valve and a heat pump system having the same capable of forming a plurality of coolant lines depending on selected modes of the vehicle through a simplified control of a single valve.

A multi-way coolant valve includes an outer housing formed with a first outer inlet, a second outer inlet, a third outer inlet, a first outer outlet, a second outer outlet, and a third outer outlet, where a pump mount portion is formed to at least one of the first to third outer outlets, and an inner housing provided with a plurality of penetration holes formed corresponding to the first, second, and third outer inlets and the first, second, and third outer outlets, being rotatably provided within the outer housing, and including at least one coolant line formed by selectively connecting the plurality of penetration holes such that the first, second, and third outer inlets and the first, second, and third outer outlets are selectively connected. The multi-way coolant valve further includes a plurality of pads interposed between an interior circumference of the outer housing and an exterior circumference of the inner housing at locations of the first outer inlet, the second outer inlet, the third outer inlet, the first outer outlet, the second outer outlet, and the third outer outlet, respectively, and a driving unit connected to a rotation center of the inner housing and configured to selectively rotate the inner housing within the outer housing, where, as the inner housing rotates by a preset interval according to a selected vehicle mode, the first outer inlet selectively communicates with the first outer outlet, the second outer outlet, or the third outer outlet, the second outer inlet selectively communicates with the first outer outlet or the second outer outlet, and the third outer inlet selectively communicates with the first outer outlet, the second outer outlet, or the third outer outlet.

The outer housing may be formed in a cylinder shape with an open side. The first to third outer inlets and the first to third outer outlets may be formed along an exterior circumference at an equal interval.

The second outer inlet may be formed at a location spaced apart from the first outer inlet by an angle of 120° along the circumference of the outer housing. The third outer inlet may be formed at a location spaced apart from the second outer inlet by an angle of 60° along the circumference of the outer housing. The first outer outlet may be formed between the first outer inlet and the second outer inlet at a location spaced apart from the first outer inlet by an angle of 60° along the circumference of the outer housing. The second outer outlet may be formed at a location spaced apart from the second outer inlet by an angle of 180° along the circumference of the outer housing. The third outer outlet may be formed between the first outer inlet and the second outer outlet at a location spaced apart from the second outer outlet by an angle of 60° along the circumference of the outer housing.

The inner housing may be partitioned into two stages by a first partition wall formed at a height-wise center of the inner housing such that the coolant may flow through the at least one coolant line in an upper portion and a lower portion, and the inner housing is provided with the plurality of penetration holes at equal intervals along an exterior circumference.

The at least one coolant line may include a first coolant line located in a region in an upper portion of the inner housing partitioned by a second partition wall protruding from the first partition wall and formed by connecting two first penetration holes interposing a first reference hole selected from the plurality of penetration holes, a second coolant line located in a remaining region in the upper portion of the inner housing partitioned by the second partition wall and formed by connecting a second reference hole selected from the plurality of penetration holes and a second penetration hole formed at a location spaced apart from the second reference hole by an angle of 120°, and a third coolant line located in a remaining region in the upper portion of the inner housing partitioned by the second partition wall and formed by connecting a third reference hole selected from the plurality of penetration holes and a third penetration hole formed at a location spaced apart from the third reference hole by an angle of 120°.

The third coolant line may be formed by a third partition wall having a semicircular pipe shape integrally protruding from the first partition wall to be separated from the second coolant line.

The at least one coolant line may include a fourth coolant line located in a first region in a lower portion of the inner housing partitioned by a fourth partition wall protruding from the first partition wall and formed by connecting two fourth penetration holes interposing a fourth reference hole selected from the plurality of penetration holes, a fifth coolant line located in a second region in the lower portion of the inner housing partitioned by the fourth partition wall and formed by connecting two fifth penetration holes interposing a fifth reference hole selected from the plurality of penetration holes, and a sixth coolant line located in a third region in the lower portion of the inner housing partitioned by the fourth partition wall and formed by connecting two sixth penetration holes interposing a sixth reference hole selected from the plurality of penetration holes.

The fourth, fifth, and sixth coolant lines may be spaced apart by the fourth partition wall by a preset angle around the rotation center of the inner housing and are disposed at an equal interval.

The fifth coolant line and the sixth coolant line may be disposed at locations corresponding to the second and third coolant lines.

The selected mode may be selected from a plurality modes that may include a first mode, a second mode, a third mode, and a fourth mode in which the inner housing rotates within the outer housing by corresponding angles.

In the first mode, the first outer inlet may communicate with the second outer outlet by a third coolant line, the second outer inlet may communicate with the first outer outlet by a first coolant line, and the third outer inlet may communicate with the third outer outlet by a second coolant line.

In the second mode, the first outer inlet may communicate with the first outer outlet by a first coolant line, the second outer inlet may communicate with the second outer outlet by a second coolant line, and the third outer inlet may communicate with the third outer outlet by a third coolant line.

In the third mode, the first outer inlet may communicate with the third outer outlet by the fourth coolant line, the second outer inlet may communicate with the first outer outlet by the fifth coolant line, and the third outer inlet may communicate with the second outer outlet by the sixth coolant line.

In the fourth mode, the first outer inlet may communicate with the third outer outlet by a first coolant line, the third outer inlet may communicate with the first outer outlet by a second coolant line, and the second outer inlet may communicate with the second outer outlet by a third coolant line.

The pump mount portion may be respectively provided to the first outer outlet and the second outer outlet, and a water pump may be mounted on each of the pump mount portions.

The second outer inlet may be formed at a location spaced apart from the first outer inlet by an angle of 120° along the circumference of the outer housing. The third outer inlet may be formed at a location spaced apart from the second outer inlet by an angle of 60° along the circumference of the outer housing. The first outer outlet may be formed between the first outer inlet and the second outer inlet at a location spaced apart from the first outer inlet by an angle of 60° along the circumference of the outer housing. The second outer outlet may be formed at a location spaced apart from the second outer inlet by an angle of 180° along the circumference of the outer housing. The third outer outlet may be formed between the first outer inlet and the second outer outlet at a location spaced apart from the second outer outlet by an angle of 60° along the circumference of the outer housing.

A reservoir tank may be connected to the second outer inlet and the third outer inlet.

A heat pump system may include the multi-way coolant as described above, a first coolant line respectively connected to a first outer inlet and a third outer outlet provided in the multi-way coolant valve and provided with a radiator, a second coolant line connected to a second outer inlet and a first outer outlet and provided with a battery module, and a third coolant line connected to a third outer inlet and a second outer outlet and provided with an electrical component and an oil cooler, where the second coolant line is provided with a chiller connected to an air conditioner unit, where the third coolant line is provided with a heat-exchanger included in the air conditioner unit, and where an inner housing provided in the multi-way coolant valve is operated in a plurality of modes including a first mode, a second mode, a third mode, and a fourth mode in which the inner housing is rotated at corresponding angles within an outer housing.

In the first mode, the multi-way coolant valve may be configured to connect the first coolant line to the third coolant line in order to supply the coolant cooled at the radiator to the electrical component and the oil cooler, respectively, and to operate such that the second coolant line forms an independent closed circuit together with the first and third coolant lines.

In the second mode, the multi-way coolant valve may be configured to operate such that the first coolant line, the second coolant line, and the third coolant line form a single interconnected circuit in order to supply the coolant cooled at the radiator to the electrical component, the oil cooler, and the battery module, respectively.

In the third mode, the multi-way coolant valve may be configured to operate such that the first coolant line, the second coolant line, and the third coolant line form independent closed circuits, respectively, and a refrigerant flows through the heat-exchanger by an operation of the air conditioner unit in order to recollect waste heat from the electrical component and the oil cooler.

In the fourth mode, the multi-way coolant valve may be configured to operate such that the first coolant line may form an independent closed circuit, and the second coolant line and the third coolant line form a single interconnected circuit in order to recollect waste heat from the electrical component, the oil cooler, and the battery module, where a refrigerant flows through the heat-exchanger and the chiller by an operation of the air conditioner unit.

According to a multi-way coolant valve and a heat pump system having the same according to an embodiment, by forming a plurality of coolant lines between the outer housing and the inner housing by rotating the inner housing depending on the vehicle mode, the number of valves employed in the heat pump system may be minimized, and the heat pump system may be streamlined and simplified.

In addition, according to an embodiment, the valve control may become easier since a plurality of coolant lines are formed between the outer housing and the inner housing as the inner housing rotates by a predetermined angle interval.

Furthermore, according to an embodiment, it is possible to reduce manufacturing cost and weight through simplification of an entire system and to improve space utilization.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION OF ILLUSTRATIVE EMBODIMENTS

Figure 1:
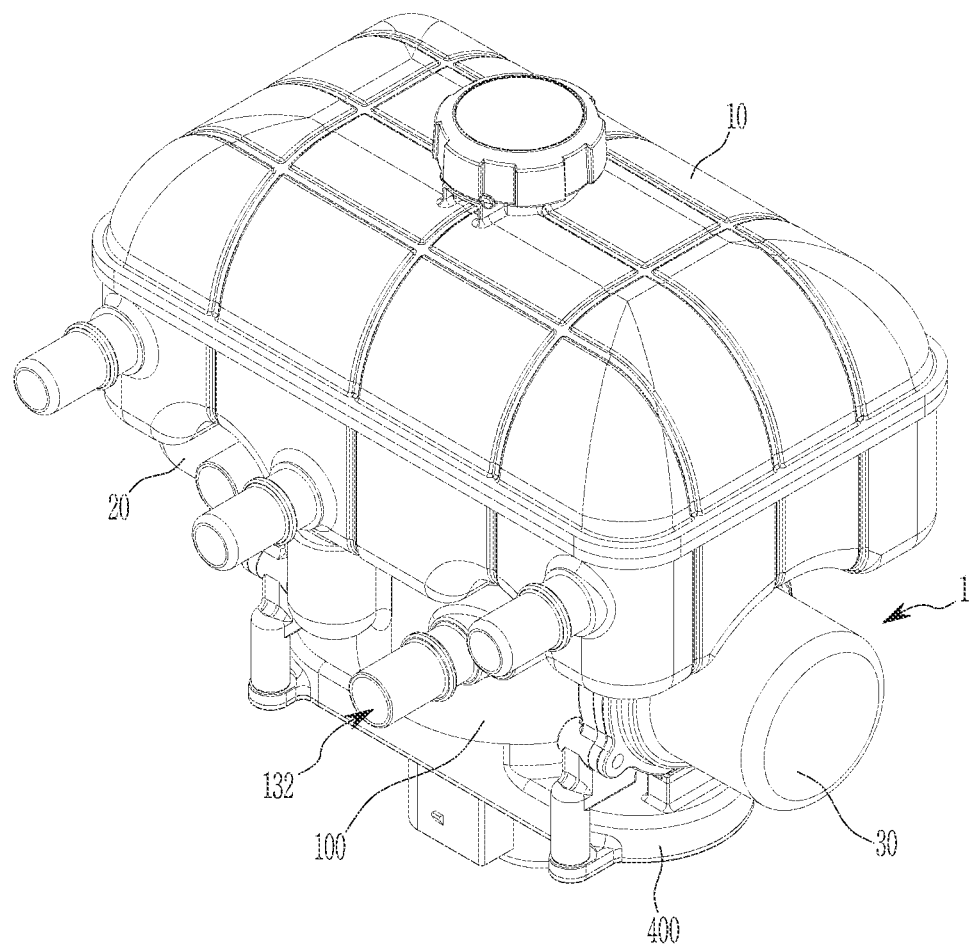
FIG. 1 is perspective view of a reservoir tank and a water pump coupled to a multi-way coolant valve according to an embodiment.

Exemplary embodiments of the present disclosure will hereinafter be described in detail with reference to the accompanying drawings.

Exemplary embodiments disclosed in the present specification and the constructions depicted in the drawings are only preferred embodiments of the present disclosure and do not cover the entire scope of the present disclosure. Therefore, it will be understood that there may be various equivalents and variations at the time of the application of this specification.

In order to clarify embodiments of the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, unless explicitly described to the contrary, the word "comprise" and variations such as "comprises" or "comprising" will be understood to imply the inclusion of stated elements but not the exclusion of any other elements.

Furthermore, each of the terms such as " . . . unit", " . . . means", " . . . portions", " . . . part", and " . . . member" described in the specification mean a unit of a comprehensive element that performs at least one function or operation.

Figure 2:
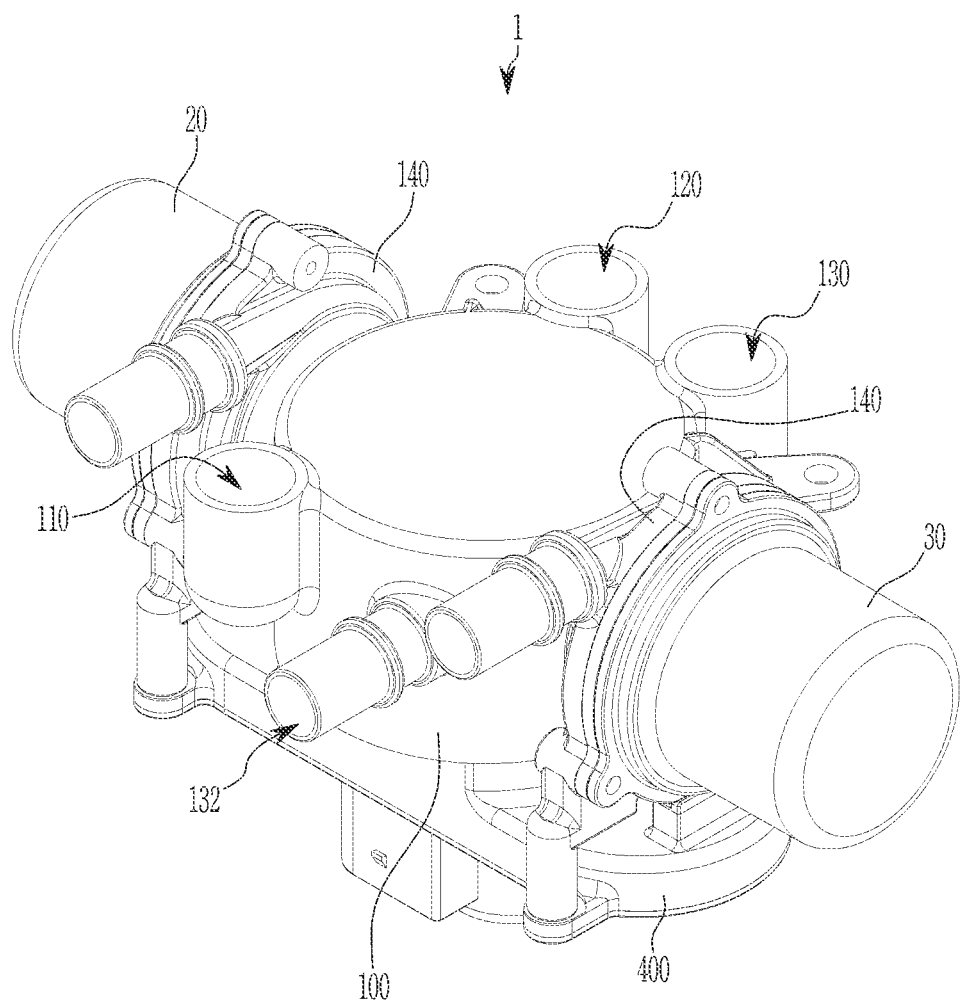
FIG. 2 is a perspective view of a multi-way coolant valve coupled with a water pump according to an embodiment.

FIG. 1 is perspective view of a reservoir tank and a water pump coupled to a multi-way coolant valve according to an embodiment. FIG. 2 is a perspective view of a multi-way coolant valve coupled with a water pump according to an embodiment.

Referring to FIG. 1 and FIG. 2, a multi-way coolant valve 1 according to an embodiment may include an outer housing 100, an inner housing 200 rotatably provided within the outer housing 100, a plurality of pads 300, and a driving unit 400.

A reservoir tank 10 is disposed on top of the outer housing 100, and the reservoir tank 10 may be connected to the outer housing 100 such that stored coolant may flow to the outer housing 100.

Here, a first water pump 20 and a second water pump 30 may be respectively mounted on the outer housing 100. The first water pump 20 may supply the coolant to a second coolant line 4 included in a heat pump system.

The second water pump 30 may supply the coolant to a first coolant line 2 and a third coolant line 6 included in the heat pump system (see, e.g., FIGS. 15-19).

In addition, the driving unit 400 is connected to a rotation center of the inner housing 200 and may selectively rotate the inner housing 200 within the outer housing 100.

That is, the driving unit 400 may generate power to rotate the inner housing 200. Accordingly, the driving unit 400 may rotate the inner housing 200 within the outer housing 100 by a predetermined angle such that the introduced coolant may flow through a plurality of flow paths.

The driving unit 400 is mounted on a lower portion of the outer housing 100, and a rotation shaft of the driving unit 400 may be connected to the rotation center of the inner housing 200.

The driving unit 400 may be realized by utilizing a step motor, a solenoid, and the like, such that the inner housing 200 may be rotated to a preset angle depending on a selected vehicle mode.

Hereinafter, configurations of the outer housing 100 and the inner housing 200 are described in detail with reference to the drawings.

Figure 3:
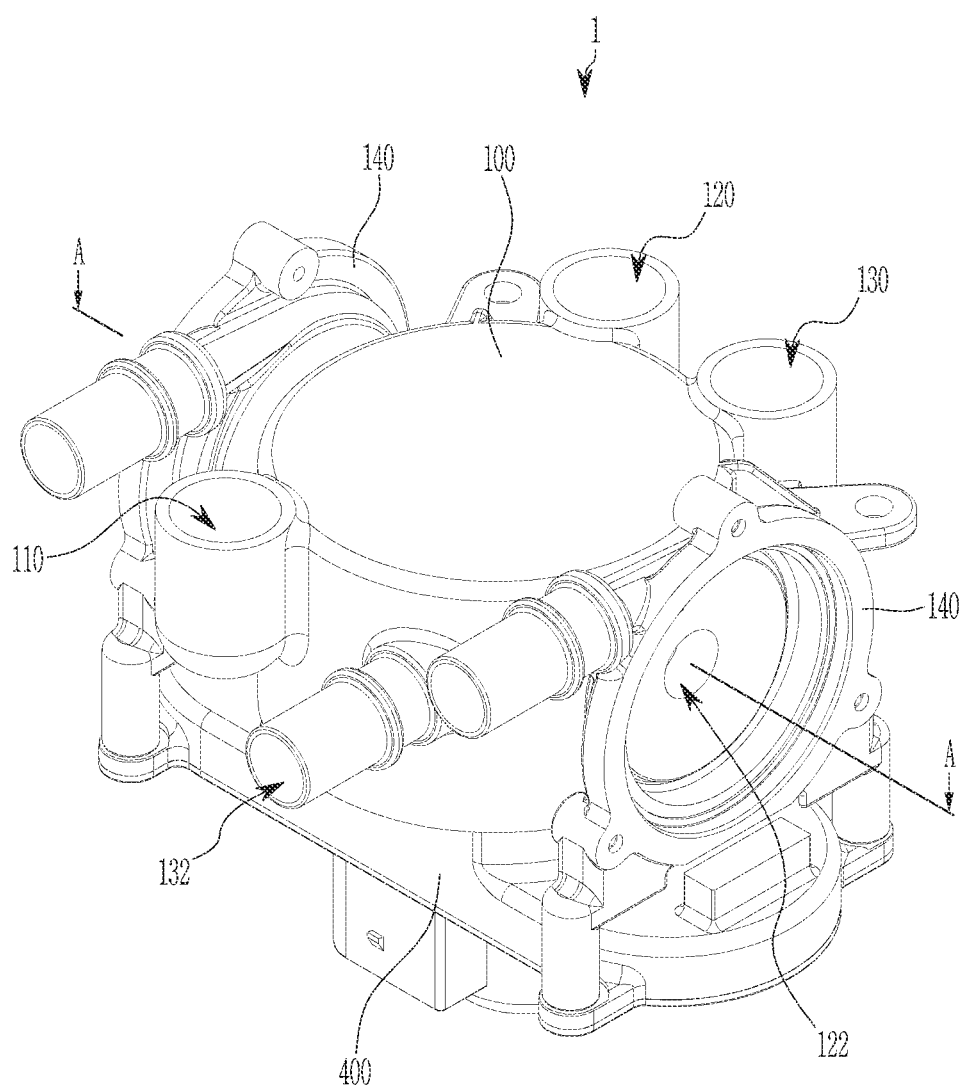
FIG. 3 is a perspective view of a multi-way coolant valve according to an embodiment.
Figure 4:
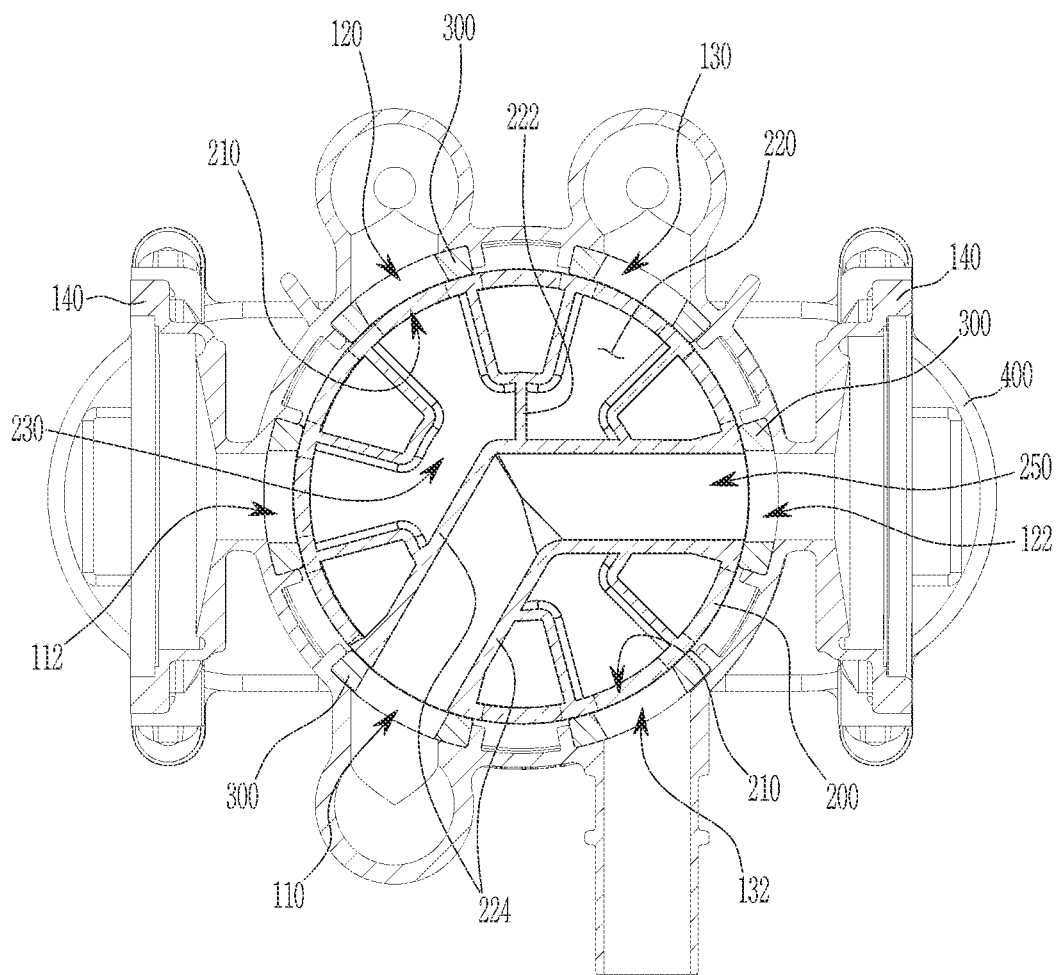
FIG. 4 is a cross-sectional view along line A-A of FIG. 3.
Figure 5:
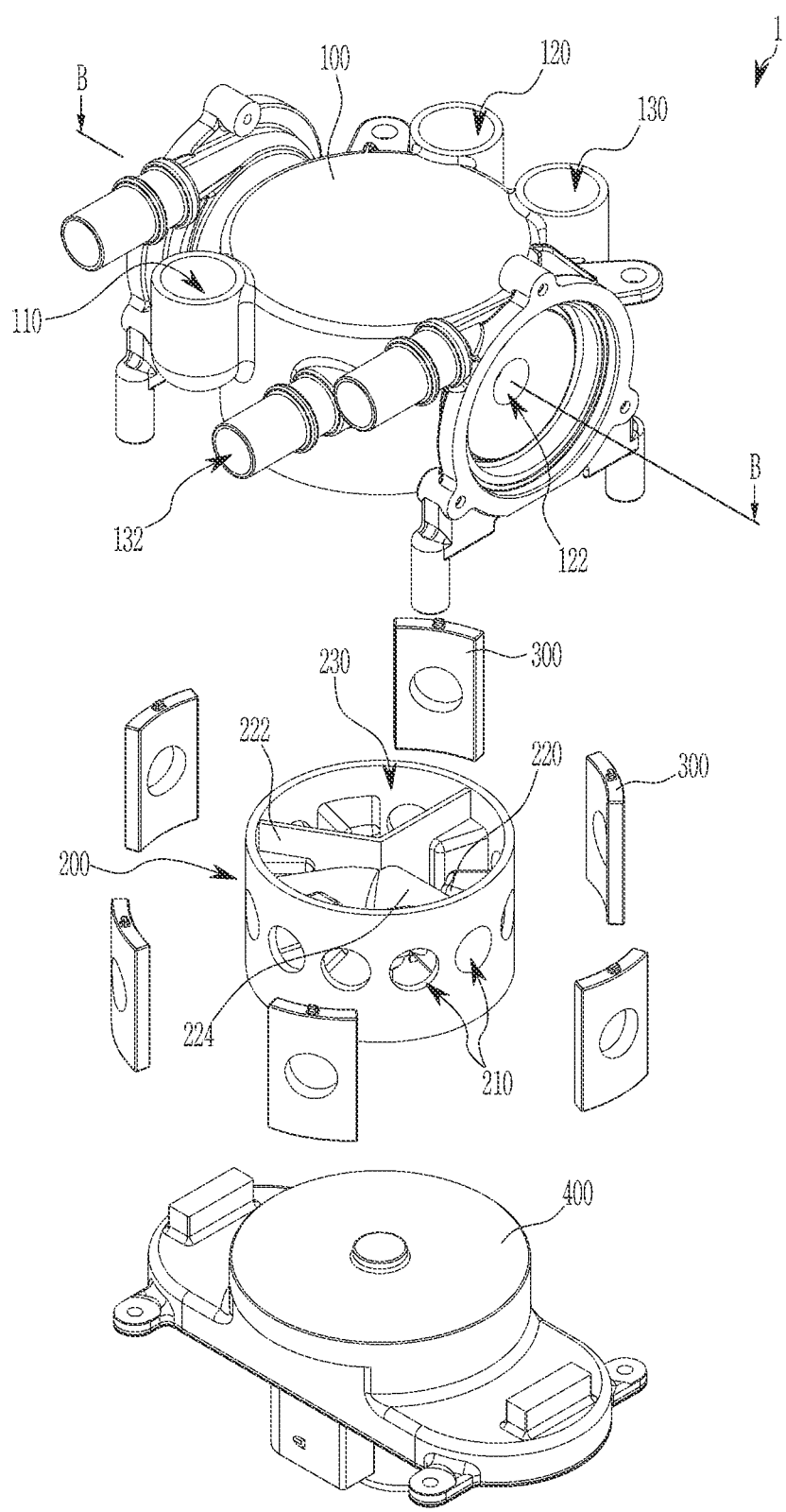
FIG. 5 is an exploded perspective view of a multi-way coolant valve according to an embodiment.
Figure 6:
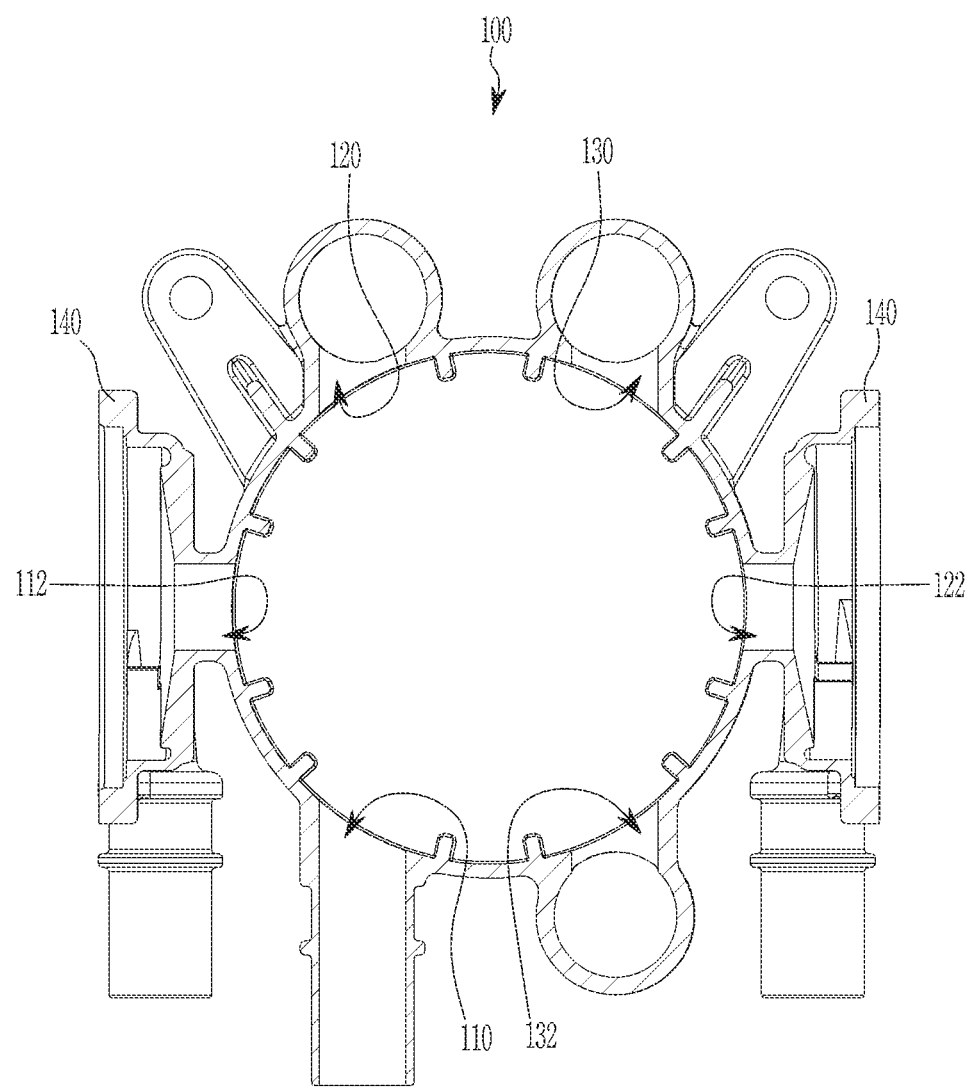
FIG. 6 is a cross-sectional view along line B-B of FIG. 5.
Figure 7:
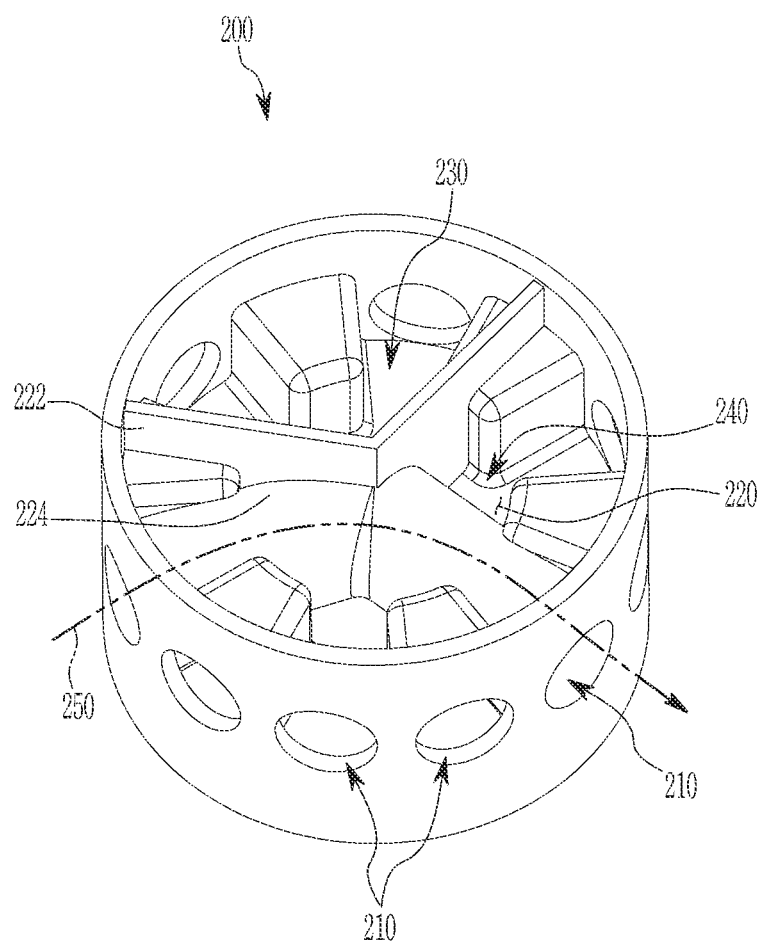
FIG. 7 is a perspective view of an inner housing applied to a multi-way coolant valve according to an embodiment.
Figure 8:
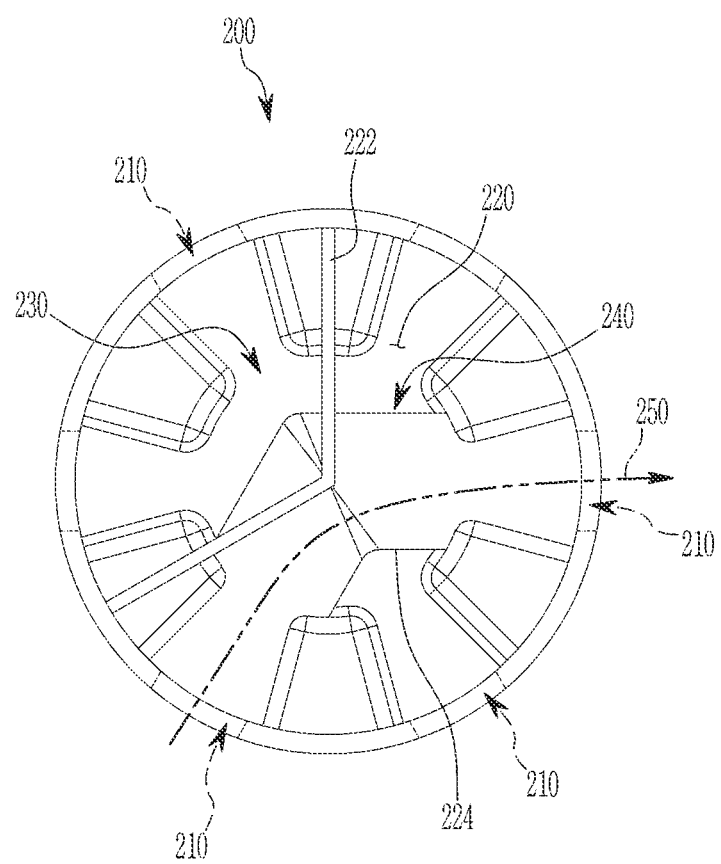
FIG. 8 is a top plan view of an inner housing applied to a multi-way coolant valve according to an embodiment.
Figure 9:
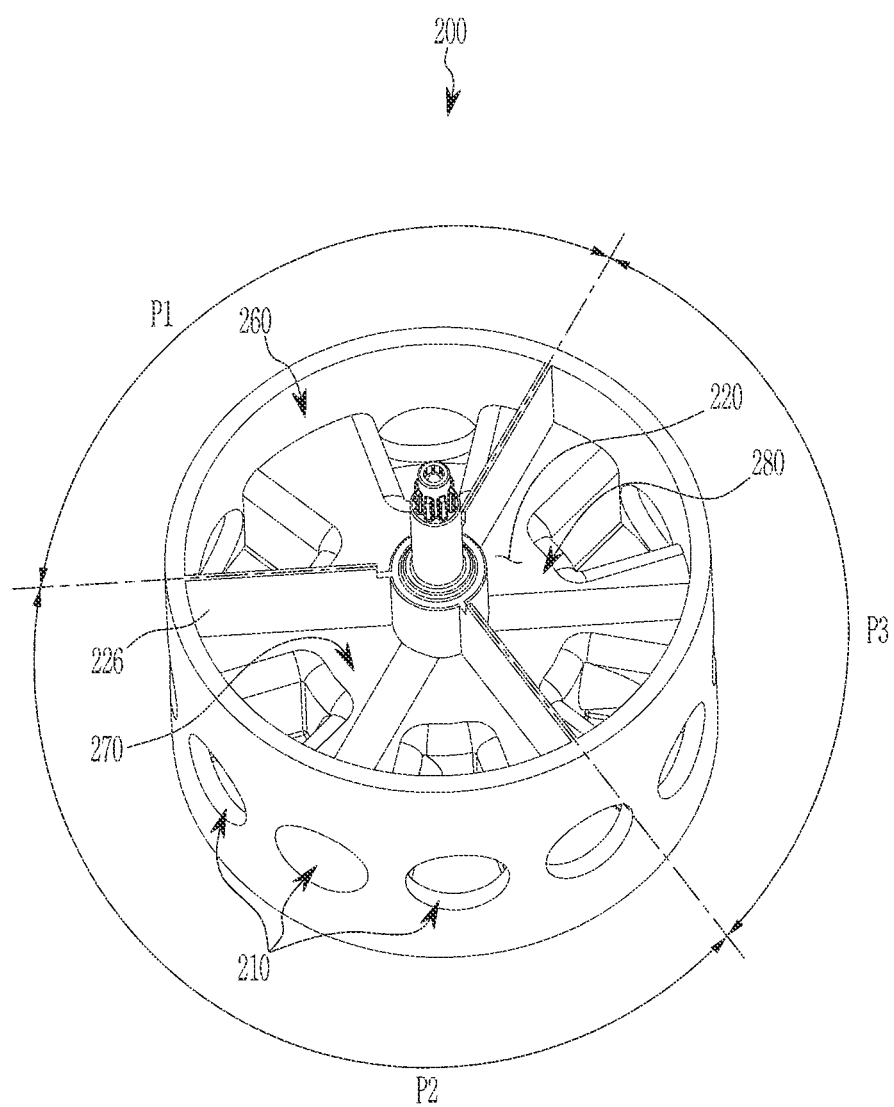
FIG. 9 is a bottom perspective view of an inner housing applied to a multi-way coolant valve according to an embodiment.
Figure 10:
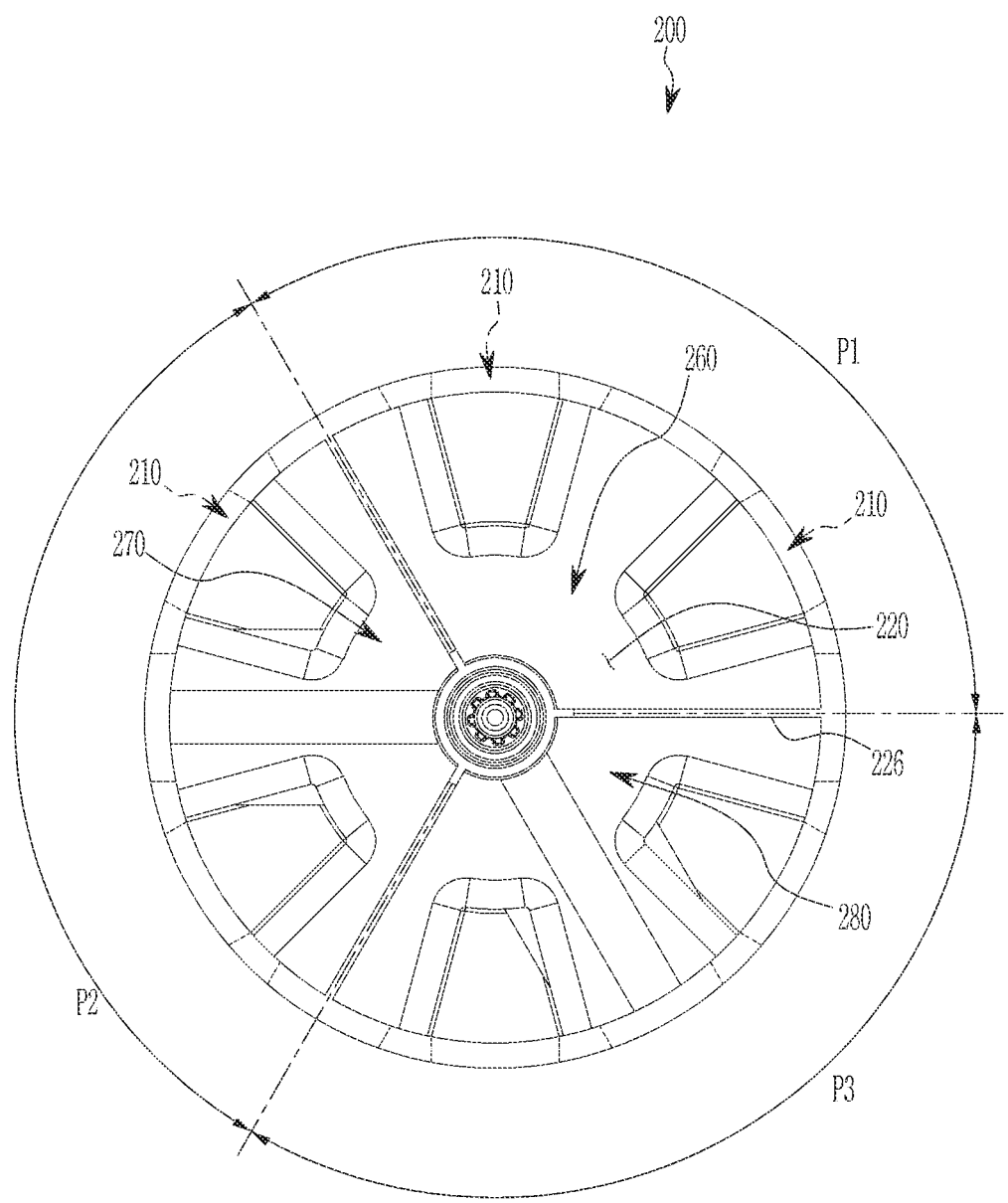
FIG. 10 is a bottom view of an inner housing applied to a multi-way coolant valve according to an embodiment.

FIG. 3 is a perspective view of a multi-way coolant valve according to an embodiment. FIG. 4 is a cross-sectional view along line A-A of FIG. 3. FIG. 5 is an exploded perspective view of a multi-way coolant valve according to an embodiment. FIG. 6 is a cross-sectional view along line B-B of FIG. 5. FIG. 7 is a perspective view of an inner housing applied to a multi-way coolant valve according to an embodiment. FIG. 8 is a top plan view of an inner housing applied to a multi-way coolant valve according to an embodiment. FIG. 9 is a bottom perspective view of an inner housing applied to a multi-way coolant valve according to an embodiment. FIG. 10 is a bottom view of an inner housing applied to a multi-way coolant valve according to an embodiment.

As shown in FIG. 4 to FIG. 6, the outer housing 100 is formed with a first outer inlet no, a second outer inlet 120, a third outer inlet 130, a first outer outlet 112, a second outer outlet 122, and a third outer outlet 132 that communicate with an interior and are formed along an exterior circumference at an equal interval. The outer housing 100 may be formed in a cylinder shape with an open lower side.

In addition, the first and second outer outlets 112 and 122 of the outer housing 100 may be integrally provided with a pump mount portion 140 for mounting the first and second water pumps 20 and 30.

That is, the first outer outlet 112 and the second outer outlet 122 are respectively provided with the pump mount portion 140. The first water pump 20 is mounted on the pump mount portion 140 provided to the first outer outlet 112. In addition, the second water pump 30 may be mounted on the pump mount portion 140 provided to the second outer outlet 122 (refer to FIG. 1 and FIG. 2).

Here, as shown in FIG. 6, the second outer inlet 120 may be disposed at a location spaced apart from the first outer inlet no by an angle of 120° along a circumference of the outer housing boo.

The third outer inlet 130 may be disposed at a location spaced apart from the second outer inlet 120 by an angle of 60° along the circumference of the outer housing 100.

Meanwhile, the reservoir tank 10 may be connected to the second outer inlet 120 and the third outer inlet 130 (refer to FIG. 1).

In the present embodiment, the first outer outlet 112 may be formed between the first outer inlet no and the second outer inlet 120 at a location spaced apart from the first outer inlet no by an angle of 60° along the circumference of the outer housing 100.

The second outer outlet 122 may be formed at a location spaced apart from the second outer inlet 120 by an angle of 180° along the circumference of the outer housing 100.

In addition, the third outer outlet 132 may be formed between the first outer inlet no and the second outer outlet 122 at a location spaced apart from the second outer outlet 122 by an angle of 60° along the circumference of the outer housing 100.

In the present embodiment, as shown in FIG. 7 to FIG. 10, the inner housing 200 is provided with a plurality of penetration holes 210 formed corresponding to the first, second, and third outer inlets 110, 120, and 130 and the first, second, and third outer outlets 112, 122, and 132, and rotatably provided within the outer housing 100.

The inner housing 200 may include at least one coolant line formed by selectively connecting the plurality of penetration holes 210 such that the first, second, and third outer inlets 110, 120, and 130 and the first, second, and third outer outlets 112, 122, and 132 are selectively connected.

Here, the inner housing 200 may be formed in a hollow cylinder shape with open upper and lower sides.

In addition, the inner housing 200 may be partitioned vertically into two stages by a first partition wall 220 formed at a height-wise center of the inner housing 200 such that the coolant may flow through the at least one coolant line in an upper portion and a lower portion.

In addition, the penetration holes 210 may be formed along an exterior circumference of the inner housing 200 at an equal interval.

Meanwhile, in the present embodiment, the plurality of pads 300 may be interposed between the interior circumference of the outer housing 100 and the exterior circumference of the inner housing 200, at locations of the first outer inlet no, the second outer inlet 120, the third outer inlet 130, the first outer outlet 112, the second outer outlet 122, and the third outer outlet 132, respectively.

The plurality of pads 300 prevents direct contact between the outer housing 100 and the inner housing 200 when the inner housing 200 is rotated by the driving unit 400 and thus may minimize damage or wear due to friction.

In addition, the plurality of pads 300 may prevent the coolant from leaking to an exterior of the outer housing 100 when the at least one coolant line is formed by selectively connecting the first, second, and third outer inlets 110, 120, and 130 and the first, second, and third outer outlets 112, 122, and 132.

In the present embodiment, the at least one coolant line of the inner housing may include the first coolant line 230, a second coolant line 240, a third coolant line 250, a fourth coolant line 260, a fifth coolant line 270, and a sixth coolant line 280.

First, as shown in FIG. 7 and FIG. 8, the first coolant line 230 may be located in a region in an upper portion of the inner housing 200 partitioned by a second partition wall 222 protruding from the first partition wall 220.

The first coolant line 230 may be formed by connecting two first penetration holes 210 interposing a first reference penetration hole 210 selected from the plurality of penetration holes 210.

The second coolant line 240 may be located in a remaining region in the upper portion of the inner housing 200 partitioned by the second partition wall 222.

The second coolant line 240 may be formed by connecting a second reference penetration hole 210 selected from the plurality of penetration holes 210 and a second penetration hole 210 formed at a location spaced apart from the second reference penetration hole 210 by an angle of 120°.

In the present embodiment, the third coolant line 250 may be located in a remaining region in the upper portion of the inner housing 200 partitioned by the second partition wall 222.

The third coolant line 250 may be formed by connecting a third reference penetration hole 210 selected from the plurality of penetration holes 210 and a third penetration hole 210 formed at a location spaced apart from the third reference penetration hole 210 by an angle of 120°.

Here, the third coolant line 250 may be formed by a third partition wall 224 having a semicircular pipe shape integrally protruding from the first partition wall 220 to be separated from the second coolant line 240.

In addition, as shown in FIG. 9 and FIG. 10, the fourth coolant line 260 may be located in a first region P1 in a lower portion of the inner housing 200 partitioned by a fourth partition wall 226 protruding from the first partition wall 220.

The fourth coolant line 260 may be formed by connecting two fourth penetration holes 210 interposing a fourth reference penetration hole 210 selected from the plurality of penetration holes 210.

The fifth coolant line 270 may be located in a second region P2 in the lower portion of the inner housing 200 partitioned by the fourth partition wall 226.

The fifth coolant line 270 may be formed by connecting two fifth penetration holes 210 interposing a fifth reference penetration hole 210 selected from the plurality of penetration holes 210.

In addition, the sixth coolant line 280 may be located in a third portion P3 in the lower portion of the inner housing 200 partitioned by the fourth partition wall 226.

The sixth coolant line 280 may be formed by connecting two sixth penetration holes 210 interposing a sixth reference penetration hole 210 selected from the plurality of penetration holes 210.

Here, the fourth, fifth, and sixth coolant lines 260, 270, and 280 may be spaced apart by the fourth partition wall 226 by a preset angle along a circumferential direction around the rotation center of the inner housing 200 and may be disposed at an equal interval.

Accordingly, the fourth partition wall 226 divides the lower portion of the inner housing 200 at an angle of 120° along the circumferential direction into the first, second, and third regions P1, P2, and P3.

In addition, the fifth coolant line 270 and the sixth coolant line 280 may be disposed at locations corresponding to the second and third coolant lines 240 and 250 formed in the upper portion of the inner housing 200.

That is, the first, second, and third coolant lines 230, 240 and 250 may be located in the upper portion of the inner housing 200 with reference to the first partition wall 220. In addition, the fourth, fifth, and sixth coolant lines 260, 270, and 280 may be located in the lower portion of the inner housing 200 with reference to the first partition wall 220.

In the multi-way coolant valve 1 configured as above, when the inner housing 200 is rotated by a preset angle by the driving unit 400, the first to sixth coolant lines 230, 240, 250, 260, 270, and 280 may form various coolant flow paths by selectively connecting the first to third outer inlets 110, 120, and 130 to the first to third outer outlets 112, 122, and 132.

That is, when the inner housing 200 rotates by a preset interval according to the selected vehicle mode, the first outer inlet no may selectively communicate with the first outer outlet 112, the second outer outlet 122, or the third outer outlet 132 by a selected coolant line of the coolant lines.

In addition, the second outer inlet 120 may selectively communicate with the first outer outlet 112 or the second outer outlet 122 by the selected coolant line of the coolant lines.

In addition, the third outer inlet 130 may selectively communicate with the first outer outlet 112, the second outer outlet 122, or the third outer outlet 132 by the selected coolant line of the coolant lines.

Hereinafter, the operation and action of the multi-way coolant valve 1 according to an embodiment configured as above is described in detail with reference to FIG. 11 to FIG. 14.

In the present embodiment, the selected mode may be selected from a plurality of modes that includes a first mode, a second mode, a third mode, and a fourth mode in which the inner housing 200 rotates within the outer housing 100 by corresponding angles by an operation of the driving unit 400.

That is, the multi-way coolant valve 1 may be operated in the first mode to fourth mode.

First, an operation in the first mode is described with reference to FIG. 11.

Figure 11:
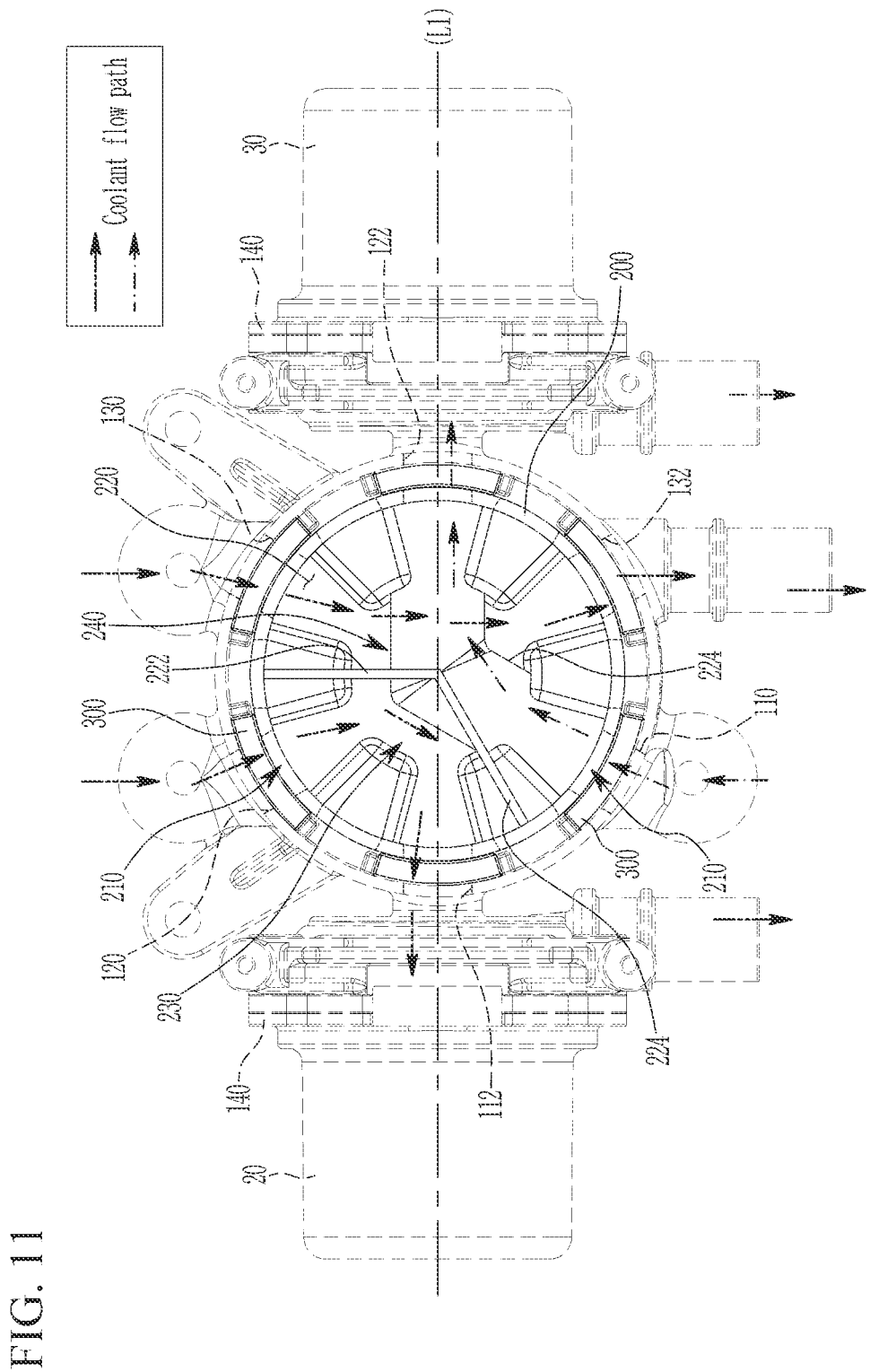
FIG. 11 is a drawing illustrating an operation in a first mode of a multi-way coolant valve according to an embodiment.

FIG. 11 is a drawing illustrating an operation in a first mode of a multi-way coolant valve according to an embodiment.

Referring to FIG. 11, in the first mode, the first outer inlet 110 communicates with the second outer outlet 122 by the third coolant line 250.

Accordingly, the coolant introduced through the first outer inlet 110 may flow through the third coolant line 250 and be discharged through the second outer outlet 122.

Simultaneously, the second outer inlet 120 communicates with the first outer outlet 112 by the first coolant line 230.

Therefore, the coolant introduced through the second outer inlet 120 may flow through the first coolant line 230 and be discharged through the first outer outlet 112.

Simultaneously, the third outer inlet 130 communicates with the third outer outlet 132 by the second coolant line 240.

Accordingly, the coolant introduced through the third outer inlet 130 may flow through the second coolant line 240 and be discharged through the third outer outlet 132.

In the present embodiment, an operation in the second mode is described with reference to FIG. 12.

Figure 12:
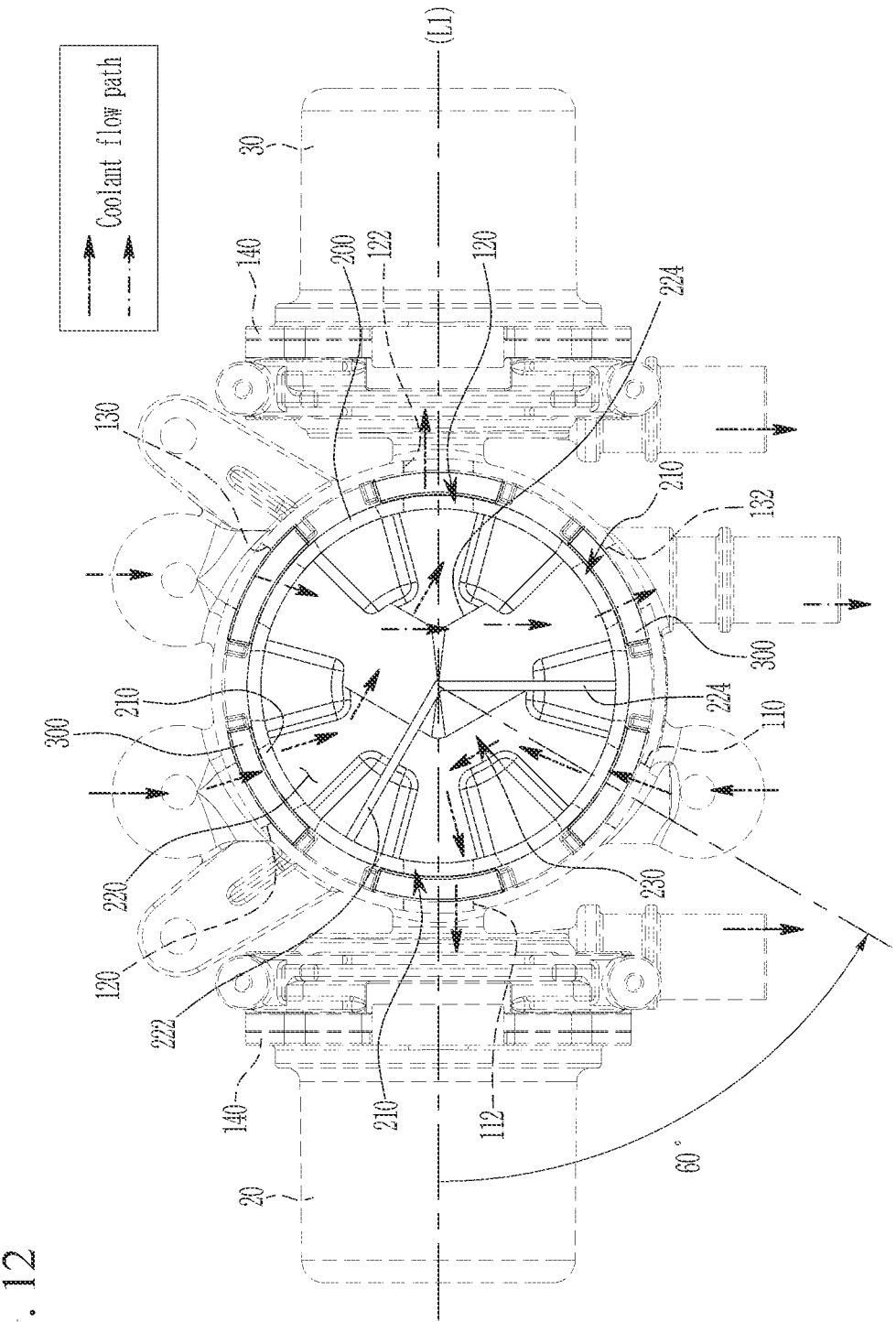
FIG. 12 is a drawing illustrating an operation in a second mode of a multi-way coolant valve according to an embodiment.

FIG. 12 is a drawing illustrating an operation in a second mode of a multi-way coolant valve according to an embodiment.

Referring to FIG. 12, in the second mode, the first outer inlet 110 communicates with the first outer outlet 112 by the first coolant line 230.

That is, the second mode means a state in which the inner housing 200 is rotated counterclockwise from the state of the first mode by an angle of 60° around an imaginary line Li passing through the first outer outlet 112 and the second outer outlet 122.

Accordingly, the coolant introduced through the first outer inlet no may flow through the first coolant line 230 and be discharged through the first outer outlet 112.

Simultaneously, the second outer inlet 120 communicates with the second outer outlet 122 by the second coolant line 240.

Then, the coolant introduced through the second outer inlet 120 may flow through the second coolant line 240 and be discharged through the second outer outlet 122.

In addition, the third outer inlet 130 communicates with the third outer outlet 132 by the third coolant line 250.

Accordingly, the coolant introduced through the third outer inlet 130 may flow through the third coolant line 250 and be discharged through the third outer outlet 132.

In the present embodiment, an operation in the third mode is described with reference to FIG. 13.

Figure 13:
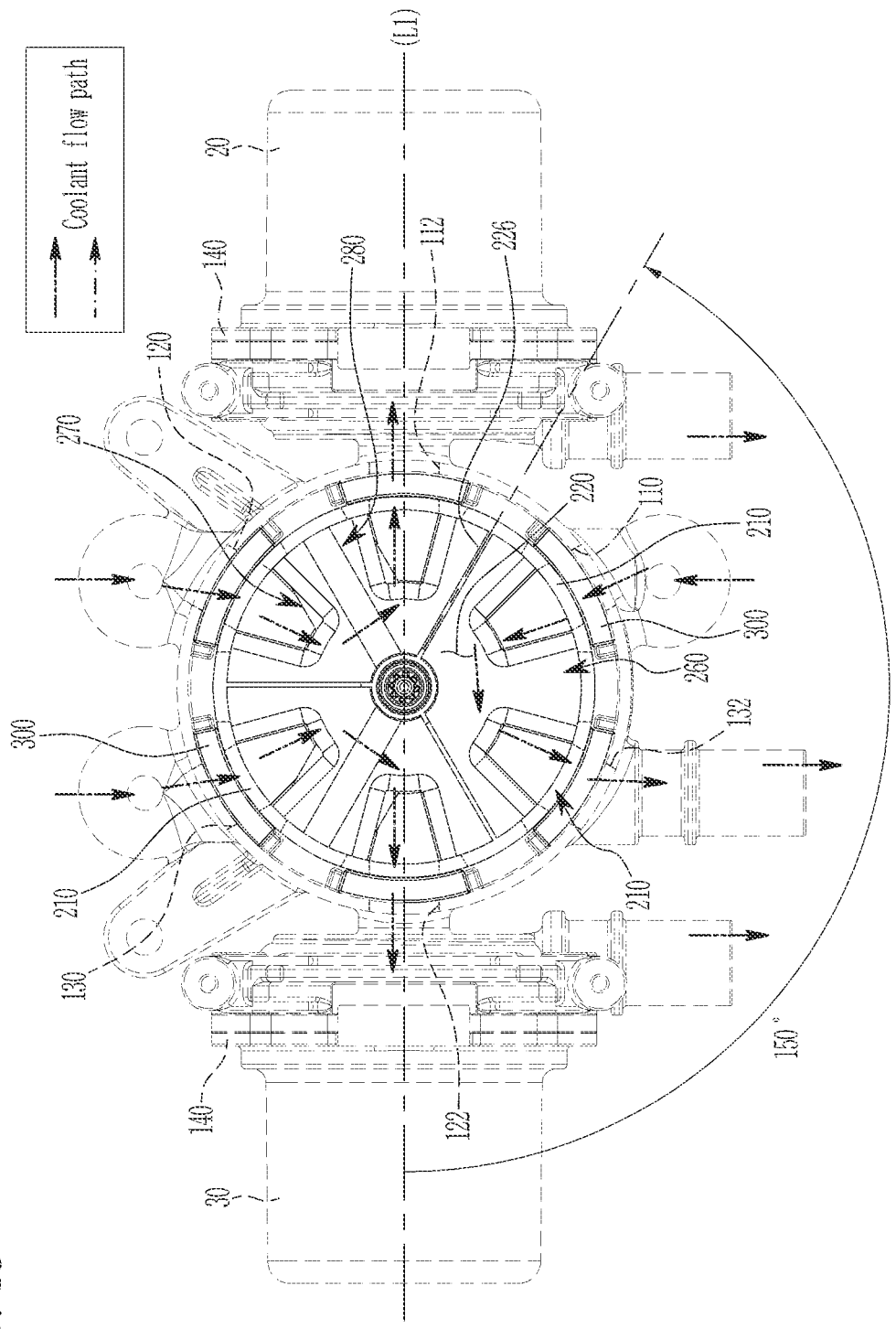
FIG. 13 is a drawing illustrating an operation in a third mode of a multi-way coolant valve according to an embodiment.

FIG. 13 is a drawing illustrating an operation in a third mode of a multi-way coolant valve according to an embodiment.

Referring to FIG. 13, in the third mode, the first outer inlet no communicates with the third outer outlet 132 by the fourth coolant line 260.

That is, the third mode means a state in which the inner housing 200 is rotated counterclockwise from the state of the first mode by an angle of 150° around the imaginary line Li passing through the first outer outlet 112 and the second outer outlet 122.

Accordingly, the coolant introduced through the first outer inlet no may flow through the fourth coolant line 260 and be discharged through the third outer outlet 132.

Simultaneously, the second outer inlet 120 communicates with the first outer outlet 112 by the fifth coolant line 270.

Then, the coolant introduced through the second outer inlet 120 may flow through the fifth coolant line 270 and be discharged through the first outer outlet 112.

Simultaneously, the third outer inlet 130 communicates with the second outer outlet 122 by the sixth coolant line 280.

Accordingly, the coolant introduced through the third outer inlet 130 may flow through the sixth coolant line 280 and be discharged through the second outer outlet 122.

In addition, an operation in the fourth mode is described with reference to FIG. 14.

Figure 14:
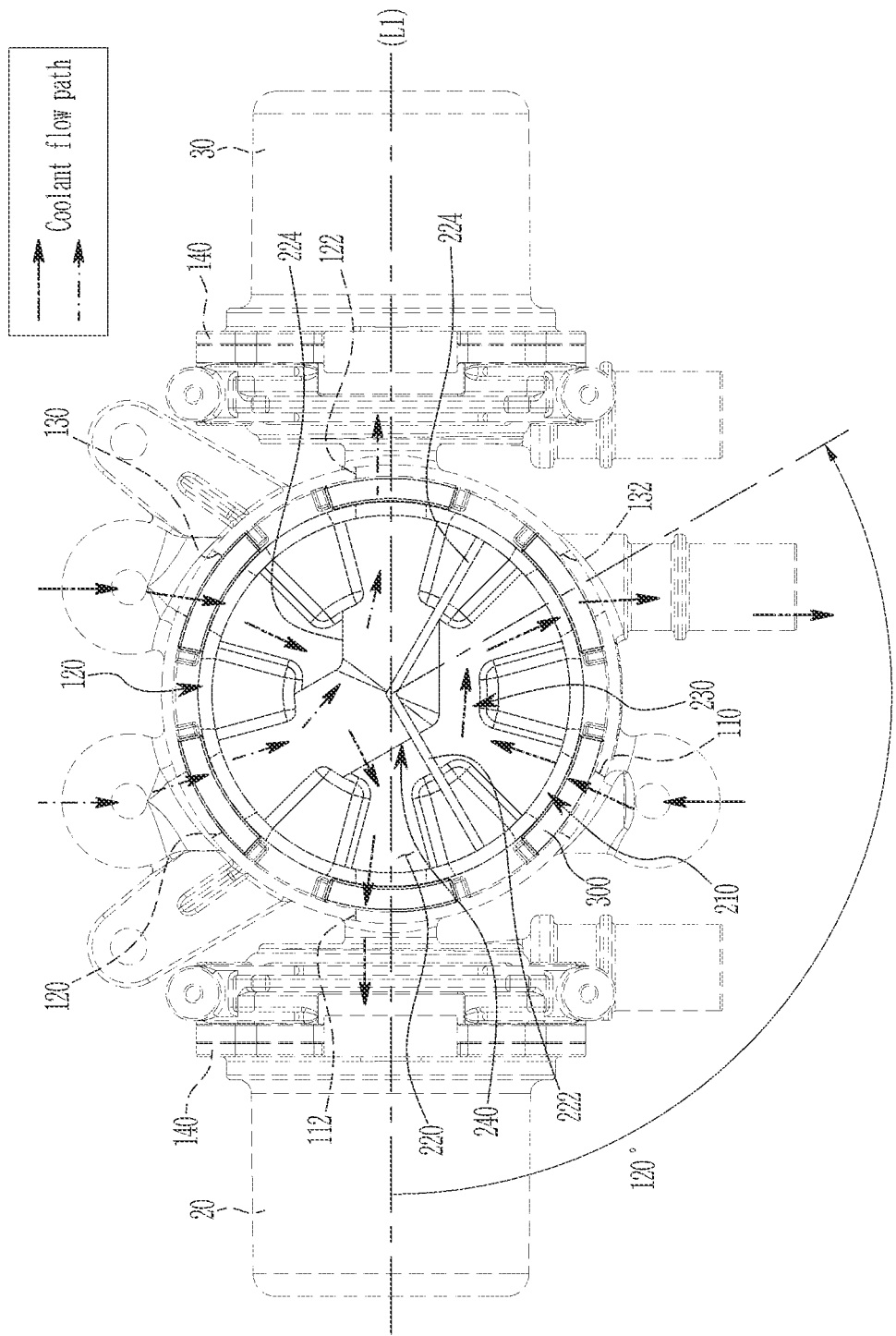
FIG. 14 is a drawing illustrating an operation in a fourth mode of a multi-way coolant valve according to an embodiment.

FIG. 14 is a drawing illustrating an operation in a fourth mode of a multi-way coolant valve according to an embodiment.

Referring to FIG. 14, in the fourth mode, the first outer inlet no communicates with the third outer outlet 132 by the first coolant line 230.

That is, the fourth mode means a state in which the inner housing 200 is rotated counterclockwise from the state of the first mode by an angle of 120° around the imaginary line Li passing through the first outer outlet 112 and the second outer outlet 122.

Accordingly, the coolant introduced through the first outer inlet no may flow through the first coolant line 230 and be discharged through the third outer outlet 132.

Simultaneously, the third outer inlet 130 communicates with the first outer outlet 112 by the second coolant line 240.

Therefore, the coolant introduced through the third outer inlet 130 may flow through the second coolant line 240 and be discharged through the first outer outlet 112.

Simultaneously, the second outer inlet 120 communicates with the second outer outlet 122 by the third coolant line 250.

Accordingly, the coolant introduced through the second outer inlet 120 may flow through the third coolant line 250 and be discharged through the second outer outlet 122.

Therefore, according to the multi-way coolant valve 1 enabling the first mode to the fourth mode, by forming a plurality of coolant lines between the outer housing 100 and the inner housing 200 by rotating the inner housing 200 depending on the vehicle mode, the number of valves employed in the heat pump system may be minimized, and the heat pump system may be streamlined and simplified.

Hereinafter, the heat pump system applied with the multi-way coolant valve 1 configured as described above is described in detail with reference to FIG. 15.

Figure 15:
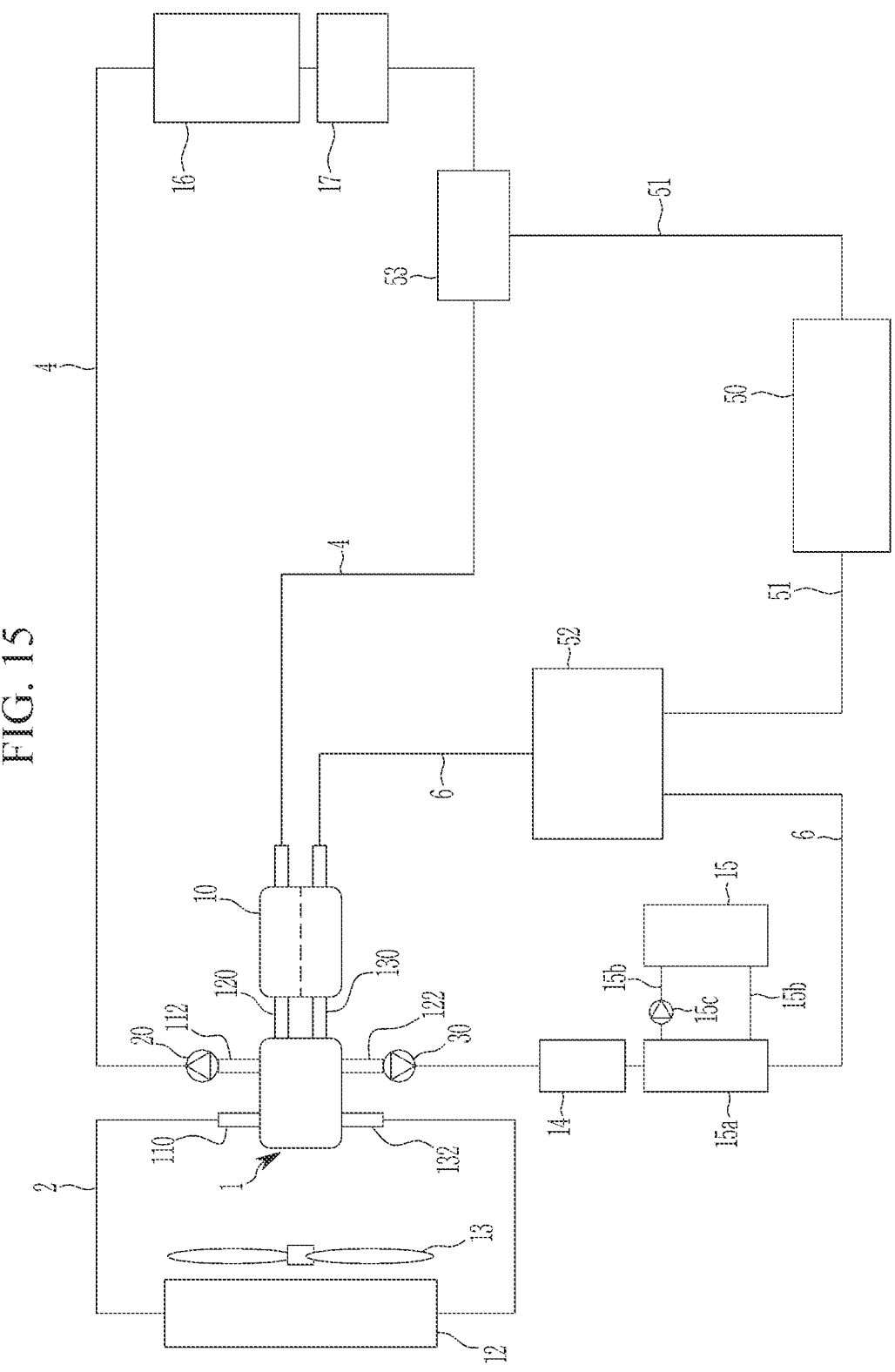
FIG. 15 is a block diagram of a heat pump system applied with a multi-way coolant valve according to an embodiment.

FIG. 15 is a block diagram of the heat pump system applied with a multi-way coolant valve according to an embodiment.

Referring to FIG. 15, the heat pump system may be applied to an electric vehicle and may include the multi-way coolant valve 1 and the first coolant line 2, the second coolant line 4, and the third coolant line 6 of the heat pump system that are connected to the multi-way coolant valve 1.

First, a first end of the first coolant line 2 may be connected to the first outer inlet 110, and a second end of the first coolant line 2 may be connected to the third outer outlet 132.

The first coolant line 2 may be provided with a radiator 12. The radiator 12 is disposed at a front of the vehicle, a cooling fan 13 is provided at a rear of the vehicle, and the coolant is cooled by an operation of the cooling fan 13 and the heat-exchange with ambient air.

In the present embodiment, a first end of the second coolant line 4 may be connected to the second outer inlet 120, and a second end of the second coolant line 4 may be connected to the first outer outlet 112.

The second coolant line 4 may be provided with a battery module 16. The battery module 16 supplies power to an electrical component 14 and a drive motor 15 and is formed in a water-cooled structure cooled by the coolant flowing along the second coolant line 4.

Meanwhile, the second coolant line 4 may be provided with a coolant heater 17.

When heating of the battery module 16 is required, the coolant circulating the second coolant line 4 is heated by turning on the coolant heater 17, and thereby the coolant with increased temperature may be supplied to the battery module 16.

The coolant heater 17 may be an electrical heater operated according to supply of power.

In addition, a first end of the third coolant line 6 may be connected to the third outer inlet 130, and a second end of the third coolant line 6 may be connected to the second outer outlet 122.

The third coolant line 6 may be provided with the electrical component 14 and an oil cooler 15a.

The electrical component 14 includes an inverter and an on-board charger (OBC). On the other hand, the electrical component 14 may further include an electric power control unit (EPCU) or an autonomous driving controller.

The electrical component 14 may be cooled in the water-cooled scheme by the coolant supplied to the third coolant line 6.

Accordingly, when the waste heat of the electrical component is desired to be recollected in the heating mode of the vehicle, heat generated from the power control apparatus, the inverter, the charger, or the autonomous driving controller may be recollected.

In addition, the oil cooler 15a is connected to cool the drive motor 15 and may be selectively cooled by the coolant supplied to the third coolant line 6.

The drive motor 15 is connected to the oil cooler 15a through an oil line 15b, and the oil line 1513, may be provided with a hydraulic pump 15c.

While only one drive motor 15 has been described in the present embodiment, the present disclosure is not limited thereto, and it may be understood that more than one drive motor 15 may be provided, for example, for front wheels and rear wheels, respectively.

In the present embodiment, a heat-exchanger 52 included in an air conditioner unit 50 is provided in the third coolant line 6. The coolant flows through an interior of the heat-exchanger 52, which is connected to the air conditioner unit 50 through a refrigerant line 51.

The heat-exchanger 52 may condense or evaporate the refrigerant through heat-exchange with the coolant supplied through the third coolant line 6 depending on the vehicle mode. That is, the heat-exchanger 52 may be a water-cooled heat-exchanger through which the coolant may flow.

In addition, a chiller 53 connected to the air conditioner unit 50 is provided in the second coolant line 4. The coolant flows through an interior of the chiller 53, and the chiller 53 is connected to the air conditioner unit 50 through the refrigerant line 51.

The chiller 53 may adjust the temperature of the coolant by enabling the coolant selectively flowing through the chiller 53 to heat-exchange with the refrigerant supplied from the air conditioner unit 50. Here, the chiller 53 may be a water-cooled heat-exchanger through which the coolant may flow.

In the heat pump system configured as above, the multi-way coolant valve 1 may be operated in the first mode to the fourth mode in which the inner housing 200 is rotated within the outer housing 100 by the driving unit 400 at the corresponding angles.

That is, the multi-way coolant valve 1 may be operated in a selected mode selected from the first mode to fourth mode.

First, in the first mode, in a vehicle cooling mode, the electrical component 14 and the oil cooler 15a may be cooled by using the coolant cooled at the radiator 12, and the battery module 16 may be cooled by using the coolant having heat-exchange in the chiller 53.

In the second mode, while the air conditioner unit 50 is not operated, the electrical component 14, the oil cooler 15a, and the battery module 16 may be cooled by using the coolant cooled at the radiator 12.

In the third mode, in a vehicle heating mode, the waste heat generated at the electrical component 14 and the oil cooler 15a may be recollected by using the coolant circulating the third coolant line 6, and the recollected waste heat may be used for heating of the vehicle interior.

In addition, in the fourth mode, in the vehicle heating mode, the waste heat generated at the electrical component 14, the oil cooler 15a, and the battery module 16 may be recollected by using the coolant circulating the second coolant line 4 and the third coolant line 6, and the recollected waste heat may be used for heating of the vehicle interior.

Hereinafter, operation and action of the heat pump system configured as above is described in detail with reference to FIG. 16 to FIG. 19.

First, an operation in the first mode is described with reference to FIG. 16.

Figure 16:
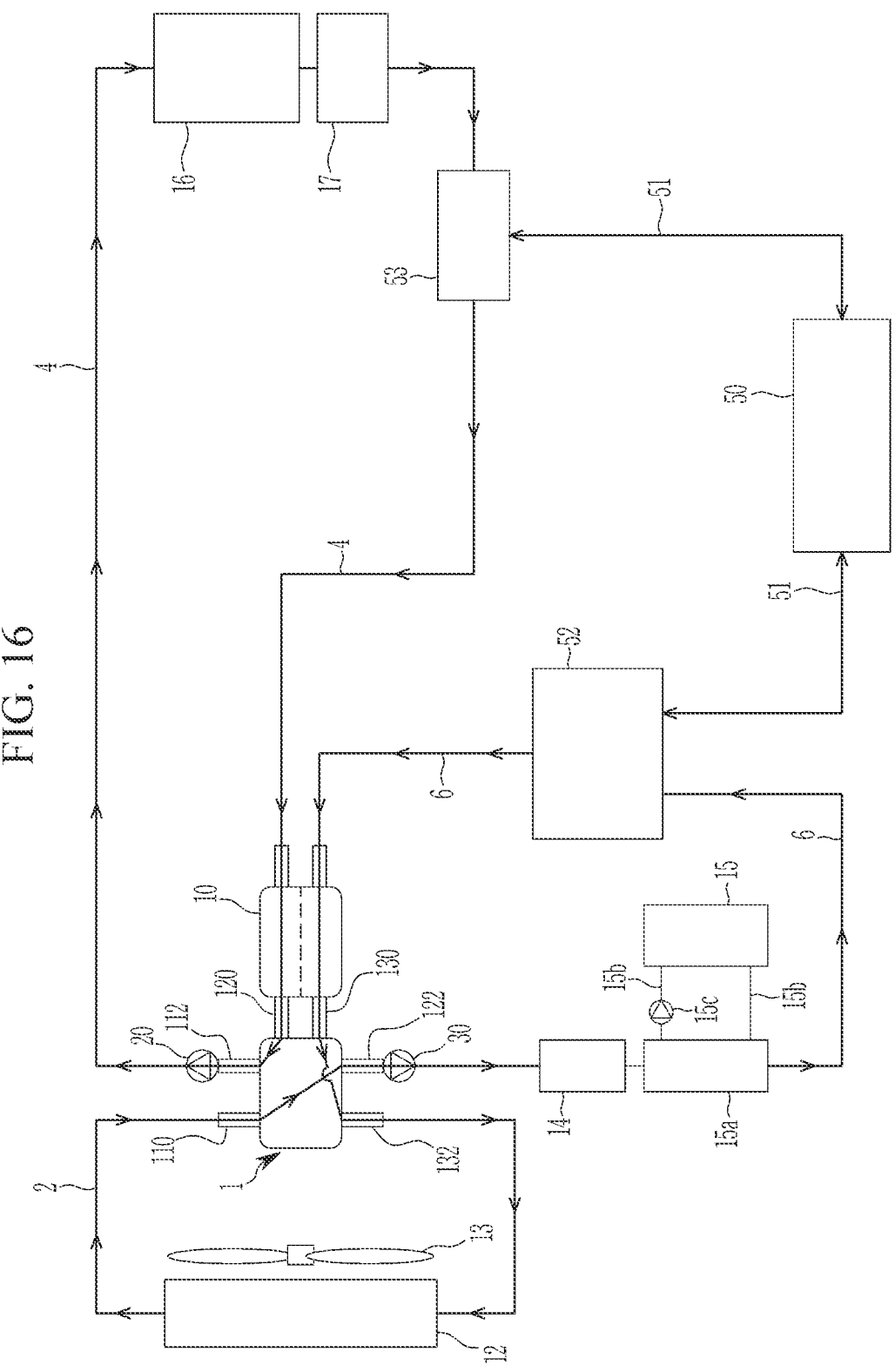
FIG. 16 is a drawing illustrating an operation in a first mode of a heat pump system according to an embodiment.

FIG. 16 is a drawing illustrating an operation in a first mode of the heat pump system according to an embodiment.

In the first mode, in the vehicle cooling mode, the electrical component 14 and the oil cooler 15a may be cooled by using the coolant cooled at the radiator 12, and the battery module 16 may be cooled by using the coolant having heat-exchange in the chiller 53.

Referring to FIG. 16, in the first mode, the multi-way coolant valve 1 may connect the first coolant line 2 to the third coolant line 6 in order to supply the coolant cooled at the radiator 12 to the electrical component 14 and the oil cooler 15a, respectively.

Simultaneously, the multi-way coolant valve 1 may operate such that the second coolant line 4 forms an independent closed circuit together with the first and third coolant lines 2 and 6.

That is, when the multi-way coolant valve 1 is operated in the first mode, the first outer inlet no communicates with the second outer outlet 122 by the third coolant line 250 such that the first coolant line 2 is connected to the third coolant line 6.

Simultaneously, the third outer inlet 130 communicates with the third outer outlet 132 through the second coolant line 240.

Then, the coolant introduced through the first outer inlet no from the first coolant line 2 is discharged through the second outer outlet 122 connected to the third coolant line 6 through the third coolant line 250.

The coolant introduced through the third outer inlet 130 from the third coolant line 6 may flow through the second coolant line 240 and be discharged through the third outer outlet 132 connected to the first coolant line 2.

Accordingly, the coolant cooled at the radiator 12 may circulate from the first coolant line 2 to the third coolant line 6 through the multi-way coolant valve 1 by an operation of the second water pump 30.

The coolant having circulated the third coolant line 6 flows into the multi-way coolant valve 1 through the third outer inlet 130 and is discharged to the first coolant line 2 through the third outer outlet 132, thereby flowing back to the radiator 12.

Meanwhile, the second outer inlet 120 communicates with the first outer outlet 112 through the first coolant line 230 such that the second coolant line 4 may form an independent closed circuit.

Then, the coolant introduced through the second outer inlet 120 from the second coolant line 4 may flow through the first coolant line 230 and be discharged through the first outer outlet 112 connected to the second coolant line 4.

Accordingly, the coolant may circulate through the second coolant line 4 by an operation of the first water pump 20.

Here, the air conditioner unit 50 operates to perform the vehicle cooling mode, and the chiller 53 may adjust the temperature of the coolant by enabling the coolant introduced through the second coolant line 4 to heat-exchange with the refrigerant.

Accordingly, the low temperature coolant completed with the heat-exchange with the refrigerant in the chiller 53 is introduced to the battery module 16 along the second coolant line 4, and the battery module 16 may be efficiently cooled.

In the present embodiment, an operation in the second mode is described with reference to FIG. 17.

Figure 17:
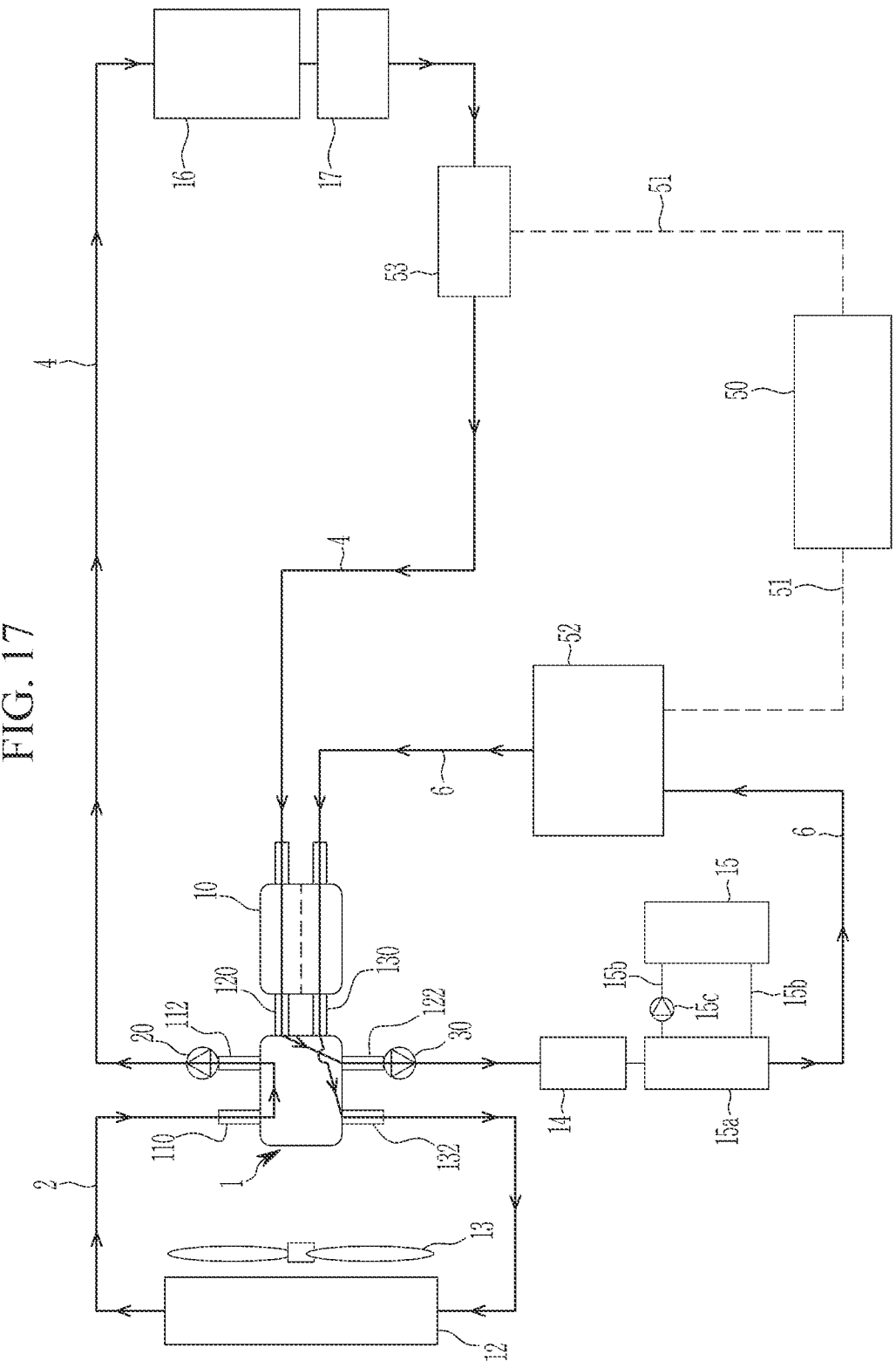
FIG. 17 is a drawing illustrating an operation in a second mode of a heat pump system according to an embodiment.

FIG. 17 is a drawing illustrating an operation in a second mode of the heat pump system according to an embodiment.

In the second mode, while the air conditioner unit 50 is not operated, the electrical component 14, the oil cooler 15a, and the battery module 16 may be cooled by using the coolant cooled at the radiator 12.

Referring to FIG. 17, in the second mode, the multi-way coolant valve 1 is configured to operate such that the first coolant line 2, the second coolant line 4, and the third coolant line 6 may form a single interconnected circuit in order to supply the coolant cooled at the radiator 12 to the battery module 16, the electrical component 14, and the oil cooler 15a, respectively.

That is, when the multi-way coolant valve 1 is operated in the second mode, the first outer inlet no may communicate with the first outer outlet 112 through the first coolant line 230 such that the first coolant line 2, the second coolant line 4, and the third coolant line 6 are interconnected.

In addition, the second outer inlet 120 communicates with the second outer outlet 122 by the second coolant line 240, and the third outer inlet 130 communicates with the third outer outlet 132 by the third coolant line 250.

Then, the coolant introduced through the first outer inlet no from the first coolant line 2 may flow through the first coolant line 230 and be discharged through the first outer outlet 112 connected to the second coolant line 4.

In addition, the coolant introduced through the second outer inlet 120 from the second coolant line 4 may flow through the second coolant line 240 and be discharged through the second outer outlet 122 connected to the third coolant line 6.

In addition, the coolant introduced through the third outer inlet 130 from the third coolant line 6 may flow through the third coolant line 250 and be discharged through the third outer outlet 132 connected to the first coolant line 2.

Accordingly, the coolant cooled at the radiator 12 may circulate along the first coolant line 2, the second coolant line 4, and the third coolant line 6 by the operation of the first and second water pumps 20 and 30 and may cool the electrical component 14, the oil cooler 15a, and the battery module 16 to prevent overheating.

In the present embodiment, an operation in the third mode is described with reference to FIG. 18.

Figure 18:
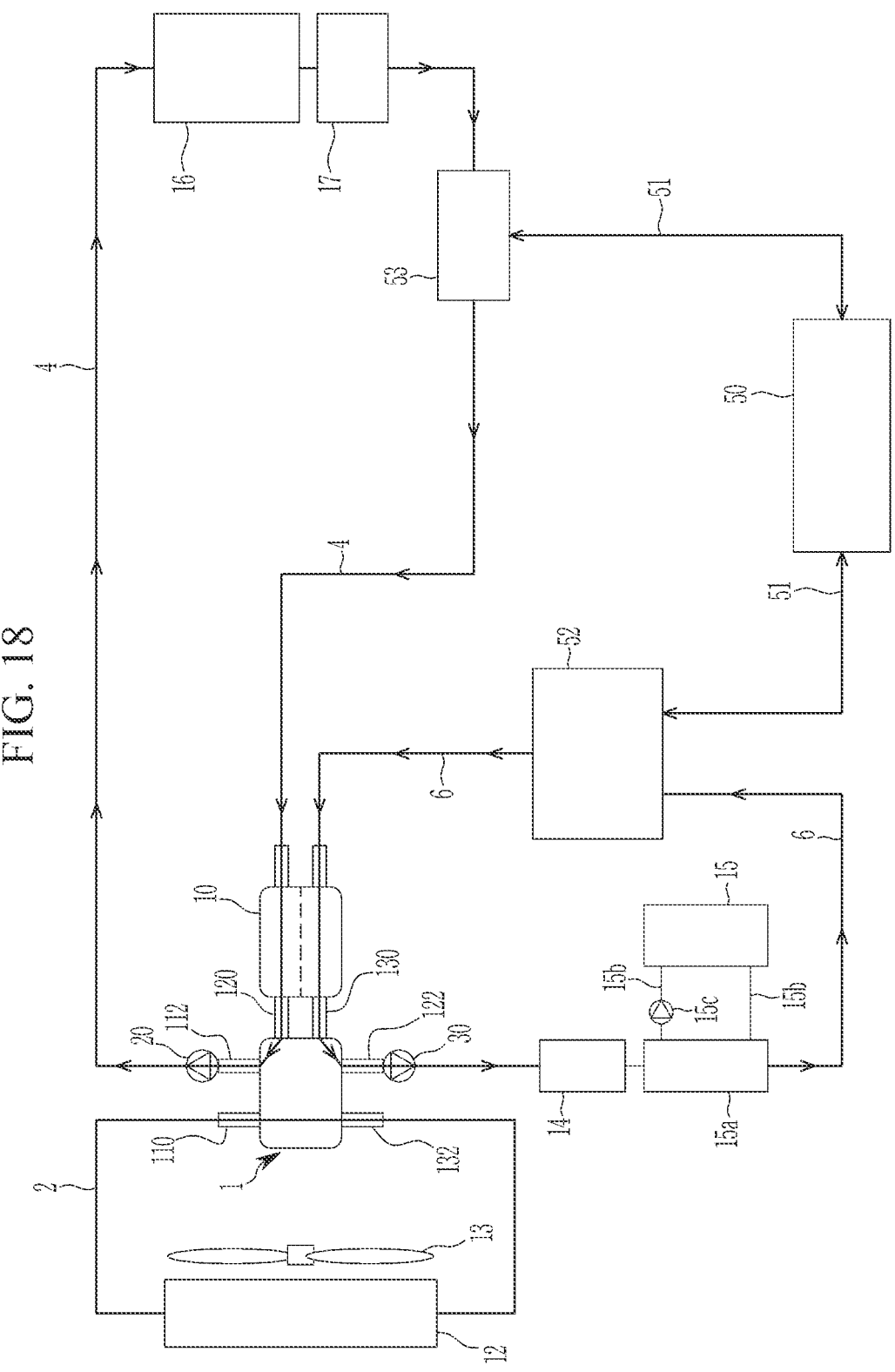
FIG. 18 is a drawing illustrating an operation in a third mode of a heat pump system according to an embodiment.

FIG. 18 is a drawing illustrating an operation in a third mode of the heat pump system according to an embodiment.

In the third mode, in the vehicle heating mode, the waste heat generated at the electrical component 14 and the oil cooler 15a may be recollected by using the coolant circulating the third coolant line 6, and the recollected waste heat may be used for heating of the vehicle interior.

Referring to FIG. 18, in the third mode, the multi-way coolant valve 1 is configured to operate such that the first coolant line 2, the second coolant line 4, and the third coolant line 6 may form an independent closed circuit, respectively.

In addition, the air conditioner unit 50 may operate such that the refrigerant is supplied to the heat-exchanger 52 through the refrigerant line 51.

That is, when the multi-way coolant valve 1 is operated in the third mode, the first outer inlet 110 communicates with the third outer outlet 132 through the fourth coolant line 260, such that the first coolant line 2, the second coolant line 4, and the third coolant line 6 form independent closed circuits respectively.

In addition, the second outer inlet 120 communicates with the first outer outlet 112 by the fifth coolant line 270. In addition, the third outer inlet 130 communicates with the second outer outlet 122 by the sixth coolant line 280.

Then, the coolant introduced through the first outer inlet 110 from the first coolant line 2 may flow through the fourth coolant line 260 and be discharged through the third outer outlet 132 connected to the first coolant line 2.

Here, the first coolant line 2 is not connected to the first water pump 20 or the second water pump 3o. Accordingly, the circulation of the coolant in the first coolant line 2 may be stopped.

In addition, the coolant introduced through the second outer inlet 120 from the second coolant line 4 may flow through the fifth coolant line 270 and be discharged through the first outer outlet 112 connected to the second coolant line 4.

Accordingly, the coolant may circulate through the second coolant line 4 by the operation of the first water pump 20.

Meanwhile, the coolant introduced through the third outer inlet 130 from the third coolant line 6 may flow through the sixth coolant line 280 and be discharged through the second outer outlet 122 connected to the third coolant line 6.

Accordingly, the coolant may circulate through the third coolant line 6 by the operation of the second water pump 30.

Here, the refrigerant flows through the heat-exchanger 52 by the operation of the air conditioner unit 50 to recollect the waste heat from the electrical component 14 and the oil cooler 15a.

That is, the coolant circulating along the second coolant line 4 increases in temperature while cooling the electrical component 14 and the oil cooler 15a. The coolant with increased temperature flows into the heat-exchanger 52.

At this time, the waste heat from the coolant is recollected through the heat-exchange between the refrigerant and the coolant in the heat-exchanger 52, and the recollected waste heat may be used for heating of the vehicle interior.

In addition, an operation in the fourth mode is described with reference to FIG. 19.

Figure 19:
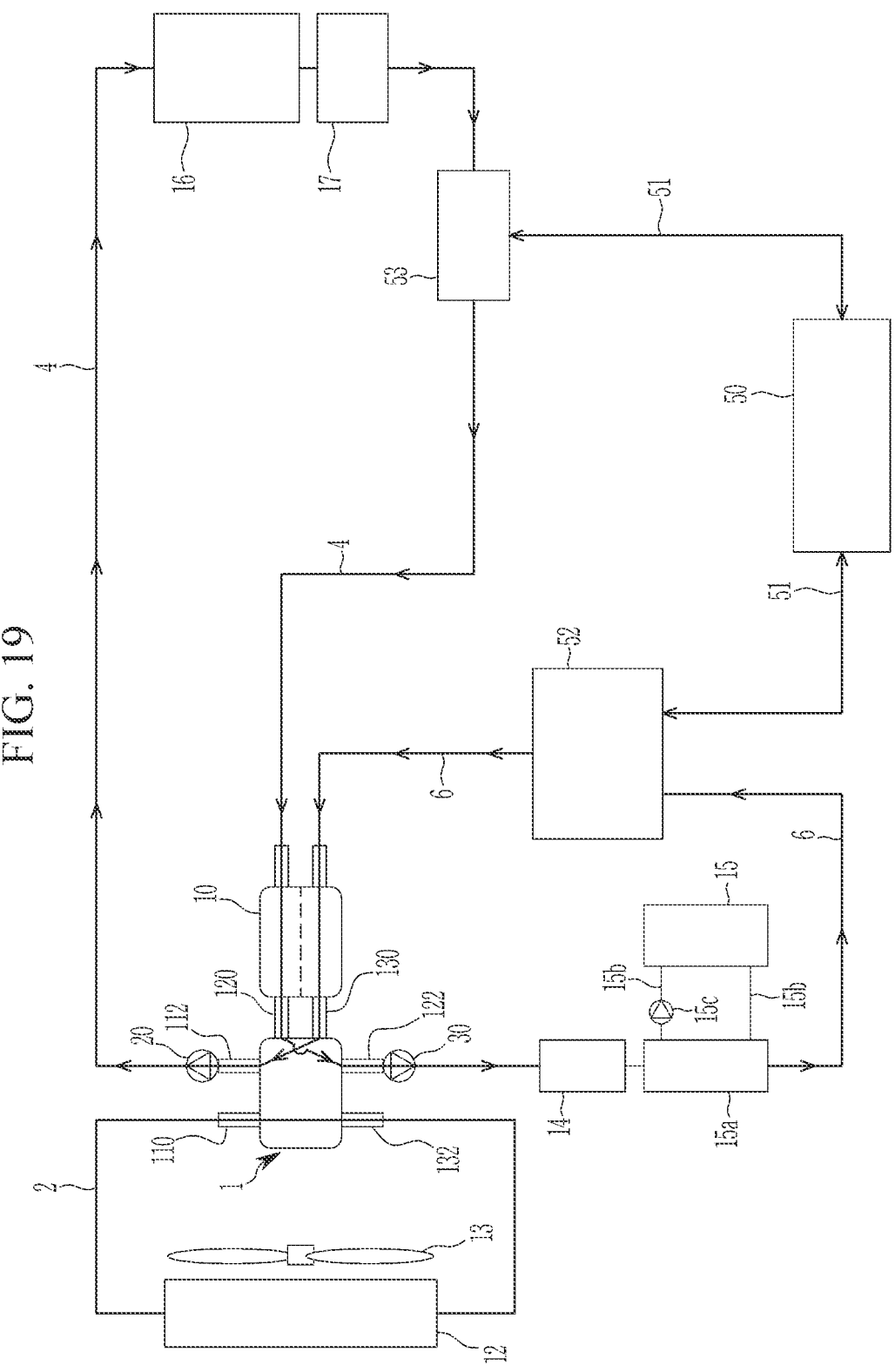
FIG. 19 is a drawing illustrating an operation in a fourth mode of a heat pump system according to an embodiment.

FIG. 19 is a drawing illustrating an operation in a fourth mode of the heat pump system according to an embodiment.

In the fourth mode, in the vehicle heating mode, the waste heat generated at the electrical component 14, the oil cooler 15a, and the battery module 16 may be recollected by using the coolant circulating the second coolant line 4 and the third coolant line 6, and the recollected waste heat may be used for heating of the vehicle interior.

Referring to FIG. 19, in the fourth mode, the multi-way coolant valve 1 is configured to operate such that the first coolant line 2 may form an independent closed circuit, and the second coolant line 4 and the third coolant line 6 form a single interconnected circuit in order to recollect the waste heat from the electrical component 14, the oil cooler 15a, and the battery module 16.

In addition, the air conditioner unit 50 may operate such that the refrigerant is supplied to the heat-exchanger 52 and the chiller 53 through the refrigerant line 51.

That is, when the multi-way coolant valve 1 is operated in the fourth mode, the first outer inlet no communicates with the third outer outlet 132 by the first coolant line 2 such that the first coolant line 2 may form an independent closed circuit.

In addition, the second outer inlet 120 communicates with the second outer outlet 122 by the third coolant line 250, and the third outer inlet 130 communicates with the first outer outlet 112 by the second coolant line 240, such that the second coolant line 4 and the third coolant line 6 form a single interconnected circuit.

Then, the coolant introduced through the first outer inlet no from the first coolant line 2 may flow through the first coolant line 230 and be discharged through the third outer outlet 132 connected to the first coolant line 2.

Here, the first coolant line 2 is not connected to the first water pump 20 or the second water pump 3o. Accordingly, the circulation of the coolant in the first coolant line 2 may be stopped.

Meanwhile, the coolant introduced through the second outer inlet 120 from the second coolant line 4 may flow through the third coolant line 250 and be discharged through the second outer outlet 122 connected to the third coolant line 6.

In addition, the coolant introduced through the third outer inlet 130 from the third coolant line 6 may flow through the second coolant line 240 and be discharged through the first outer outlet 112 connected to the second coolant line 4.

Accordingly, the second coolant line 4 and the third coolant line 6 are interconnected by the operation of the multi-way coolant valve, and the coolant may circulate through the second coolant line 4 and the third coolant line 6 by the operation of the first and second water pumps 20 and 30.

Here, the refrigerant flows through the heat-exchanger 52 and the chiller 53 by the operation of the air conditioner unit 5o, to recollect the waste heat from the electrical component 14, the oil cooler 15a, and the battery module 16.

That is, the coolant circulating along the second coolant line 4 and the third coolant line 6 increases in temperature while cooling the electrical component 14, the oil cooler 15a, and the battery module 16. The coolant with increased temperature flows into the heat-exchanger 52 and the chiller 53.

At this time, the waste heat from the coolant is recollected through the heat-exchange between the refrigerant and the coolant in the heat-exchanger 52 and the chiller 53, and the recollected waste heat may be used for heating of the vehicle interior.

Therefore, according to the multi-way coolant valve 1 according to an embodiment and the heat pump system having the same, by forming a plurality of coolant lines between the outer housing 100 and the inner housing 200 by rotating the inner housing 200 depending on the vehicle mode, the number of valves employed in the heat pump system may be minimized, and the heat pump system may be streamlined and simplified.

In addition, according to an embodiment, the valve control may become easier since a plurality of coolant lines are formed between the outer housing 100 and the inner housing 200 as the inner housing 200 rotates by a predetermined angle interval.

Furthermore, according to an embodiment, it is possible to reduce manufacturing cost and weight through simplification of an entire system and to improve space utilization.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A multi-way coolant valve comprising:
an outer housing comprising a first outer inlet, a second outer inlet, a third outer inlet, a first outer outlet, a second outer outlet, a third outer outlet, and a pump mount portion coupled to the first outer outlet, the second outer outlet, or the third outer outlet;
an inner housing rotatably provided within the outer housing, the inner housing comprising:
a plurality of penetration holes corresponding to the first outer inlet, the second outer inlet, the third outer inlet, the first outer outlet, the second outer outlet, and the third outer outlet; and
a coolant line defined by a selective connection of the plurality of penetration holes such that the first outer inlet, the second outer inlet, the third outer inlet, the first outer outlet, the second outer outlet, and the third outer outlet are selectively connected;
a plurality of pads interposed between an interior circumference of the outer housing and an exterior circumference of the inner housing at locations of the first outer inlet, the second outer inlet, the third outer inlet, the first outer outlet, the second outer outlet, and the third outer outlet, respectively; and
a driving unit connected to a rotation center of the inner housing and configured to selectively rotate the inner housing within the outer housing,
wherein, based on a rotation of the inner housing by a preset interval according to a selected vehicle mode, the first outer inlet is in selective communication with the first outer outlet, the second outer outlet, or the third outer outlet, the second outer inlet is in selective communication with the first outer outlet or the second outer outlet, and the third outer inlet is in selective communication with the first outer outlet, the second outer outlet, or the third outer outlet, and
wherein the inner housing is partitioned into two stages by a first partition wall disposed at a height-wise center of the inner housing and is configured such that a coolant is able to flow through the coolant line in an upper portion and a lower portion.

2. The multi-way coolant valve of claim 1, wherein:
the outer housing has a cylinder shape with an open side; and
the first outer inlet, the second outer inlet, the third outer inlet, the first outer outlet, the second outer outlet, and the third outer outlet are disposed along an exterior circumference of the outer housing at an equal interval.

3. The multi-way coolant valve of claim 1, wherein:
the second outer inlet is disposed at a location spaced apart from the first outer inlet by an angle of 120° along the exterior circumference of the outer housing;
the third outer inlet is disposed at a location spaced apart from the second outer inlet by an angle of 60° along the exterior circumference of the outer housing;
the first outer outlet is disposed between the first outer inlet and the second outer inlet at a location spaced apart from the first outer inlet by an angle of 60° along the exterior circumference of the outer housing;
the second outer outlet is disposed at a location spaced apart from the second outer inlet by an angle of 180° along the exterior circumference of the outer housing; and
the third outer outlet is disposed between the first outer inlet and the second outer outlet at a location spaced apart from the second outer outlet by an angle of 60° along the exterior circumference of the outer housing.

4. The multi-way coolant valve of claim 1, wherein the plurality of penetration holes are disposed at an equal interval along the exterior circumference of the inner housing.

5. The multi-way coolant valve of claim 4, wherein the coolant line comprises a plurality of coolant lines, the plurality of coolant lines comprising:
a first coolant line located in a first region in the upper portion of the inner housing partitioned by a second partition wall protruding from the first partition wall and defined by a connection of two first penetration holes interposing a first reference penetration hole selected from the plurality of penetration holes;

a second coolant line located in a second region in the upper portion of the inner housing partitioned by the second partition wall and defined by a connection of a second reference penetration hole selected from the plurality of penetration holes and a second penetration hole disposed at a location spaced apart from the second reference penetration hole by an angle of 120°; and a third coolant line located in a third region in the upper portion of the inner housing partitioned by the second partition wall and defined by a connection of a third reference penetration hole selected from the plurality of penetration holes and a third penetration hole disposed at a location spaced apart from the third reference penetration hole by an angle of 120°.

6. The multi-way coolant valve of claim 5, wherein the third coolant line is defined by a third partition wall having a semicircular pipe shape integrally protruding from the first partition wall and is separated from the second coolant line.

7. The multi-way coolant valve of claim 5, wherein the plurality of coolant lines further comprises:

a fourth coolant line located in a first region in the lower portion of the inner housing partitioned by a fourth partition wall protruding from the first partition wall and defined by a connection of two fourth penetration holes interposing a fourth reference penetration hole selected from the plurality of penetration holes;

a fifth coolant line located in a second region in the lower portion of the inner housing partitioned by the fourth partition wall and defined by a connection of two fifth penetration holes interposing a fifth reference penetration hole selected from the plurality of penetration holes; and a sixth coolant line located in a third region in the lower portion of the inner housing partitioned by the fourth partition wall and defined by a connection of two sixth penetration holes interposing a sixth reference penetration hole selected from the plurality of penetration holes.

8. The multi-way coolant valve of claim 7, wherein the fourth coolant line, the fifth coolant line, and the sixth coolant line are spaced apart by the fourth partition wall by a preset angle around the rotation center of the inner housing and are disposed at an equal interval.

9. The multi-way coolant valve of claim 7, wherein the fifth coolant line and the sixth coolant line are disposed at locations corresponding to the second coolant line and the third coolant line.

10. The multi-way coolant valve of claim 7, wherein the selected vehicle mode is selected from a plurality of modes comprising a first mode, a second mode, a third mode, and a fourth mode in which the inner housing is configured to rotate within the outer housing by corresponding angles.

11. The multi-way coolant valve of claim 10, wherein, in the first mode:

the first outer inlet is in communication with the second outer outlet by the third coolant line;
the second outer inlet is in communication with the first outer outlet by the first coolant line; and
the third outer inlet is in communication with the third outer outlet by the second coolant line.

12. The multi-way coolant valve of claim 10, wherein, in the second mode:

the first outer inlet is in communication with the first outer outlet by the first coolant line;
the second outer inlet is in communication with the second outer outlet by the second coolant line; and
the third outer inlet is in communication with the third outer outlet by the third coolant line.

13. The multi-way coolant valve of claim 10, wherein, in the third mode:

the first outer inlet is in communication with the third outer outlet by the fourth coolant line;
the second outer inlet is in communication with the first outer outlet by the fifth coolant line; and
the third outer inlet is in communication with the second outer outlet by the sixth coolant line.

14. The multi-way coolant valve of claim 10, wherein, in the fourth mode:

the first outer inlet is in communication with the third outer outlet by the first coolant line;
the third outer inlet is in communication with the first outer outlet by the second coolant line; and
the second outer inlet is in communication with the second outer outlet by the third coolant line.

15. The multi-way coolant valve of claim 1, wherein:

the pump mount portion is coupled to the first outer outlet and a second pump mount portion is coupled to the second outer outlet; and
a water pump is mounted on each of the pump mount portion and the second pump mount portion.

16. The multi-way coolant valve of claim 1, further comprising a reservoir tank connected to the second outer inlet and the third outer inlet.

17. A heat pump system comprising:

a multi-way coolant valve comprising:
    an outer housing comprising a first outer inlet, a second outer inlet, a third outer inlet, a first outer outlet, a second outer outlet, a third outer outlet, and a pump mount portion coupled to the first outer outlet, the second outer outlet, or the third outer outlet;
    an inner housing rotatably provided within the outer housing, the inner housing comprising:
        a plurality of penetration holes corresponding to the first outer inlet, the second outer inlet, the third outer inlet, the first outer outlet, the second outer outlet, and the third outer outlet; and
        a coolant line defined by a selective connection of the plurality of penetration holes such that the first outer inlet, the second outer inlet, the third outer inlet, the first outer outlet, the second outer outlet, and the third outer outlet are selectively connected;
    a plurality of pads interposed between an interior circumference of the outer housing and an exterior circumference of the inner housing at locations of the first outer inlet, the second outer inlet, the third outer inlet, the first outer outlet, the second outer outlet, and the third outer outlet, respectively; and
    a driving unit connected to a rotation center of the inner housing and configured to selectively rotate the inner housing within the outer housing;
a first coolant line comprising a radiator and respectively connected to the first outer inlet and the third outer outlet of the multi-way coolant valve;
a second coolant line comprising a battery module and a chiller connected to an air conditioner unit, the second coolant line connected to the second outer inlet and the first outer outlet of the multi-way coolant valve; and a third coolant line comprising an electrical component, an oil cooler, and a heat-exchanger included in the air conditioner unit, the third coolant line connected to the third outer inlet and the second outer outlet of the multi-way coolant valve;

wherein, based on a rotation of the inner housing by a preset interval according to a selected vehicle mode, the first outer inlet is in selective communication with the first outer outlet, the second outer outlet, or the third outer outlet, the second outer inlet is in selective communication with the first outer outlet or the second outer outlet, and the third outer inlet is in selective communication with the first outer outlet, the second outer outlet, or the third outer outlet; and wherein the selected vehicle mode is a first mode, a second mode, a third mode, or a fourth mode in which the inner housing is rotated at corresponding angles within the outer housing.

18. The heat pump system of claim 17, wherein, in the first mode, the multi-way coolant valve is configured to:

connect the first coolant line to the third coolant line in order to supply a coolant cooled at the radiator to the electrical component and the oil cooler, respectively; and operate such that the second coolant line defines an independent closed circuit together with the first coolant line and the third coolant line.

19. The heat pump system of claim 17, wherein, in the second mode, the multi-way coolant valve is configured to operate such that the first coolant line, the second coolant line, and the third coolant line define a single interconnected circuit in order to supply a coolant cooled at the radiator to the electrical component, the oil cooler, and the battery module, respectively.

20. The heat pump system of claim 17, wherein, in the third mode:

the multi-way coolant valve is configured to operate such that the first coolant line, the second coolant line, and the third coolant line define independent closed circuits, respectively; and the air conditioner unit is configured to operate to flow a refrigerant through the heat-exchanger in order to recollect waste heat from the electrical component and the oil cooler.

21. The heat pump system of claim 17, wherein, in the fourth mode:

the multi-way coolant valve is configured to operate such that:

the first coolant line defines an independent closed circuit; and the second coolant line and the third coolant line define a single interconnected circuit in order to recollect waste heat from the electrical component, the oil cooler, and the battery module; and the air conditioner unit is configured to operate to flow a refrigerant through the heat-exchanger and the chiller.

* * * * *